(12) United States Patent
Koike et al.

(10) Patent No.: US 9,261,640 B2
(45) Date of Patent: Feb. 16, 2016

(54) LIQUID CRYSTAL DISPLAY APPARATUS

(71) Applicants: KEIO UNIVERSITY, Tokyo (JP); DAI NIPPON PRINTING CO., LTD., Tokyo (JP); NITTO DENKO CORPORATION, Ibaraki-shi, Osaka (JP); NITTO JUSHI KOGYO CO., LTD., Tokyo (JP)

(72) Inventors: Yasuhiro Koike, Yokohama (JP); Runa Nakamura, Tokyo (JP); Fumihiro Arakawa, Tokyo (JP); Hiroshi Yamamoto, Tokyo (JP); Takehito Fuchida, Ibaraki (JP); Shouhei Maezawa, Ibaraki (JP); Hiroyuki Takemoto, Ibaraki (JP); Nao Murakami, Ibaraki (JP); Tsuyoshi Ishikawa, Tokyo (JP); Eizaburo Higuchi, Tokyo (JP)

(73) Assignees: KEIO UNIVERSITY, Tokyo (JP); DAI NIPPON PRINTING CO., LTD., Tokyo (JP); NITTO DENKO CORPORATION, Ibaraki-shi (JP); NITTO JUSHI KOGYO CO., LTD., Tokyo (JP)

(*) Notice: Subject to any disclaimer, the term of this patent is extended or adjusted under 35 U.S.C. 154(b) by 0 days.

(21) Appl. No.: 14/378,169

(22) PCT Filed: Feb. 14, 2013

(86) PCT No.: PCT/JP2013/053550
§ 371 (c)(1),
(2) Date: Aug. 12, 2014

(87) PCT Pub. No.: WO2013/122155
PCT Pub. Date: Aug. 22, 2013

(65) Prior Publication Data
US 2015/0029442 A1    Jan. 29, 2015

(30) Foreign Application Priority Data

Feb. 17, 2012    (JP) .................................. 2012-033285
Feb. 5, 2013    (JP) .................................. 2013-020335

(51) Int. Cl.
*G02F 1/1335*    (2006.01)
*F21V 8/00*    (2006.01)

(52) U.S. Cl.
CPC ............ *G02B 6/0038* (2013.01); *G02B 6/0053* (2013.01); *G02F 1/1336* (2013.01); *G02F 1/133528* (2013.01); *G02B 6/0068* (2013.01); *G02F 1/133536* (2013.01)

(58) Field of Classification Search
CPC ............... G02F 1/133615; G02F 2001/133607
See application file for complete search history.

(56) References Cited

U.S. PATENT DOCUMENTS 5,587,816 A    12/1996    Gunjima et al.
(Continued)

FOREIGN PATENT DOCUMENTS

EP    0 597 261 A1    5/1994
(Continued)

OTHER PUBLICATIONS

International Search Report dated Apr. 9, 2013 issued in corresponding application No. PCT/JP2013/053550.
(Continued)

*Primary Examiner* — Phu Vu
(74) *Attorney, Agent, or Firm* — Westerman, Hattori, Daniels & Adrian, LLP

(57) ABSTRACT

A liquid crystal display apparatus includes a liquid crystal display panel including a liquid crystal cell between first second polarizing plates; and a surface light source device. The surface light source device includes a light source unit, a light guide plate for outputting first directivity light having directivity of maximum intensity in a first direction, which forms a predetermined angle from a normal direction of the light output surface in a plane approximately parallel to a light guiding direction of light, and having a high ratio of a polarized light component oscillating in the plane and a prism sheet being configured to convert the first directivity light into second directivity light directed in a second direction within a predetermined angle from the normal direction of the light output surface of the light guide plate while substantially maintaining a polarization state of the first directivity light.

5 Claims, 11 Drawing Sheets

(56) References Cited

U.S. PATENT DOCUMENTS

| | | |
|---|---|---|
| 5,712,694 A | 1/1998 | Taira et al. |
| 6,027,220 A | 2/2000 | Arai |
| 2015/0062490 A1* | 3/2015 | Kwon ............... G02F 1/133621 349/64 |

FOREIGN PATENT DOCUMENTS

| | | |
|---|---|---|
| JP | 6-265892 A | 9/1994 |
| JP | 7-49496 A | 2/1995 |
| JP | 2004-363062 A | 12/2004 |
| JP | 2010-3460 A | 1/2010 |
| JP | 4673463 B2 | 4/2011 |
| JP | 2012-33341 A | 2/2012 |
| WO | 2009/104793 A1 | 8/2009 |

OTHER PUBLICATIONS

Extended European Search Report dated Oct. 20, 2015, issued in counterpart European Patent Application No. 13749648.5 (7 pages).

* cited by examiner

LIQUID CRYSTAL DISPLAY APPARATUS

TECHNICAL FIELD

The present invention relates to a liquid crystal display apparatus.

BACKGROUND ART

In recent years, as a display, a liquid crystal display apparatus using a surface light source device has been remarkably widespread. As the liquid crystal display apparatus using the surface light source device, for example, a liquid crystal display apparatus including an edge light-type surface light source device is known. In such a liquid crystal display apparatus, light emitted from a light source enters a light guide plate, and propagates through an inside of the light guide plate while repeating a total reflection on a light output surface (liquid crystal cell-side surface) of the light guide plate and a back surface thereof. A part of the light that propagates through the inside of the light guide plate allows a traveling direction thereof to be changed by a light scattering body or the like, which is provided on the back surface of the light guide plate or the like, and is output from the light output surface to an outside of the light guide plate. Such light output from the light output surface of the light guide plate is diffused and condensed by various optical sheets such as a diffusion sheet, a prism sheet, a brightness enhancement film, or the like, and thereafter, the light enters a liquid crystal panel in which polarizing plates are arranged on both sides of a liquid crystal cell. Liquid crystal molecules of a liquid crystal layer of the liquid crystal cell are driven for each of pixels to control transmission and absorption of the incident light. As a result, an image is displayed.

As described above, the liquid crystal panel includes the polarizing plates on both sides (front and back) thereof, accordingly, approximately a half of the light that enters the liquid crystal panel is absorbed by the polarizing plate on the incident side, and utilization efficiency of the light in the liquid crystal panel is essentially low. Accordingly, when a larger amount of light is attempted to be entered into the polarizing plate in order to obtain desired brightness, there are such various problems that heat from the light source adversely affects the liquid crystal and the like, resulting in difficulty viewing display, in addition to a problem in that a power consumption of the light source is increased.

Various proposals have been made in order to improve such light utilization efficiency in the liquid crystal display apparatus. As one of the proposals, there is a proposal, in which non-polarized light from the light source is separated by using a polarized light separating body that separates the non-polarized light into two pieces of linearly polarized light, which are in a perpendicular relationship to each other, by transmission and reflection, one piece of the polarized light thus separated is transmitted and directly used, and in addition, the other piece of the reflected polarized light is also reused. That is, this is a technology in which, among polarized light components separated by the polarized light separating body, one of the polarized light components, which is transmitted, allows a polarization direction of the transmission light and a transmission axis direction of a lower polarizing plate (incident-side polarizing plate) to coincide with each other, and is caused to enter the liquid crystal cell, and other polarized light component is returned to the light source side, linearly polarized state of the returned light is eliminated therefrom by birefringence, reflection, diffraction or diffusion, or the like, and the light is guided to the polarized light separating body again and is reused so that the light utilization efficiency is enhanced. For example, in Patent Literature 1, a backlight is described, in which such a light control sheet that allows output light to be substantially vertical to a surface of the planar light guide plate is provided on a light output surface side of the planar light guide plate, and polarized light separating means is further arranged thereon.

However, in the backlight described in Patent Literature 1, a structure of the polarized light separating body is complicated, and in particular, it is difficult to form a polarized light separating layer on an inclined surface portion of a columnar prism array that is triangular in cross section, with the result that mass productivity of the backlight is insufficient. In recent years, there has also been developed a surface light source device constructed so that the light output from the light guide plate has a predetermined polarization state or the like. However, output light that is the polarized light output from the light guide plate is not utilized sufficiently, effectively, and sufficient brightness is not obtained.

Moreover, in Patent Literature 2, it is described that light polarized in a predetermined direction is output from a surface light source, and a base having a birefringence ratio, such as a biaxially stretched film, is used as a base of a prism sheet, and thus the polarization direction of the polarized light that enters the liquid crystal panel is controlled to reduce the light absorbed to the polarizing plate and enhance the utilization efficiency of the light. However, also in the liquid crystal display apparatus of Patent Literature 2, the utilization efficiency of the light is still insufficient.

CITATION LIST

Patent Literature

[PTL 1] JP 06-265892 A
[PTL 2] JP 4673463 B2

SUMMARY OF INVENTION

Technical Problems

The present invention has been made in order to solve the above-mentioned problems and it is an object of the present invention to provide a liquid crystal display apparatus, which has high utilization efficiency of light, and is capable of displaying a bright image.

Solution to Problems

A liquid crystal display apparatus according to an embodiment of the present invention includes: a liquid crystal display panel including a liquid crystal cell between a first polarizing plate provided on a viewer side and a second polarizing plate provided on a back surface side; and a surface light source device for illuminating the liquid crystal display panel from the back surface side. The surface light source device includes: a light source unit; a light guide plate for causing light from the light source unit to enter from a light incident surface opposed to the light source unit, and for outputting first directivity light from a light output surface opposed to the liquid crystal display panel, the first directivity light being polarized light having directivity of maximum intensity in a first direction, which forms a predetermined angle from a normal direction of the light output surface in a plane approximately parallel to a light guiding direction of light, and having a high ratio of a polarized light component oscillating in the plane; and a prism sheet arranged on a liquid crystal display panel side with respect to the light guide plate, the prism sheet including a prism portion in which a plurality of columnar unit prisms protruding on a light guide plate side are arrayed, the prism sheet being configured to convert the first directivity light into second directivity light directed in a second direction within a predetermined angle from the normal direction of the light output surface of the light guide plate while substantially maintaining a polarization state of the first directivity light. A ridge line direction of the columnar unit prisms is approximately parallel to the light incident surface of the light guide plate, a transmission axis of the second polarizing plate is approximately parallel to a polarization direction of the second directivity light and the light guiding direction of the light in the light guide plate, and the transmission axis of the second polarizing plate is approximately perpendicular to a transmission axis of the first polarizing plate.

In one embodiment of the present invention, the prism sheet includes a base portion on the liquid crystal display panel side with respect to the prism portion, the base portion supporting the prism portion, and substantially having optical isotropy.

In one embodiment of the present invention, the first directivity light contains, by 52% or more, the polarized light component oscillating in the plane approximately parallel to the light guiding direction of the light.

In one embodiment of the present invention, the light guide plate contains a light scattering material. The light guide plate includes a plurality of columnar back surface-side unit optical elements protruding on a back surface side of the light guide plate, the plurality of columnar back surface-side unit optical elements being arrayed from the light incident surface side of the light guide plate to a side surface on an opposite side, and an array direction of the columnar unit prisms is approximately parallel to an array direction of the plurality of columnar back surface-side unit optical elements.

In one embodiment of the present invention, the liquid crystal display apparatus further includes a polarized light selective reflection sheet between the surface light source device and the first polarizing plate.

Advantageous Effects of Invention

According to one embodiment of the present invention, the liquid crystal display apparatus, which has the high utilization efficiency of the light, and is capable of displaying the bright image, can be provided. As a result, a power consumption of the light source unit can be reduced, for example, by reduction of the number of light sources and/or reduction of outputs of the light sources. Moreover, the number of members for enhancing the utilization efficiency of the light can be reduced, and accordingly, great advantages are brought from any viewpoint of cost, manufacturing efficiency, and thinning. In particular, favorable display characteristics can be maintained even when the polarized light selective reflection sheet that is extremely expensive is omitted. The thinning is realized so that a design selection range can be expanded to a large extent, and a liquid crystal display apparatus that is commercially valuable can be provided.

DESCRIPTION OF EMBODIMENTS

An embodiment of the present invention is described below with reference to the drawings and the like.

Figure 1:
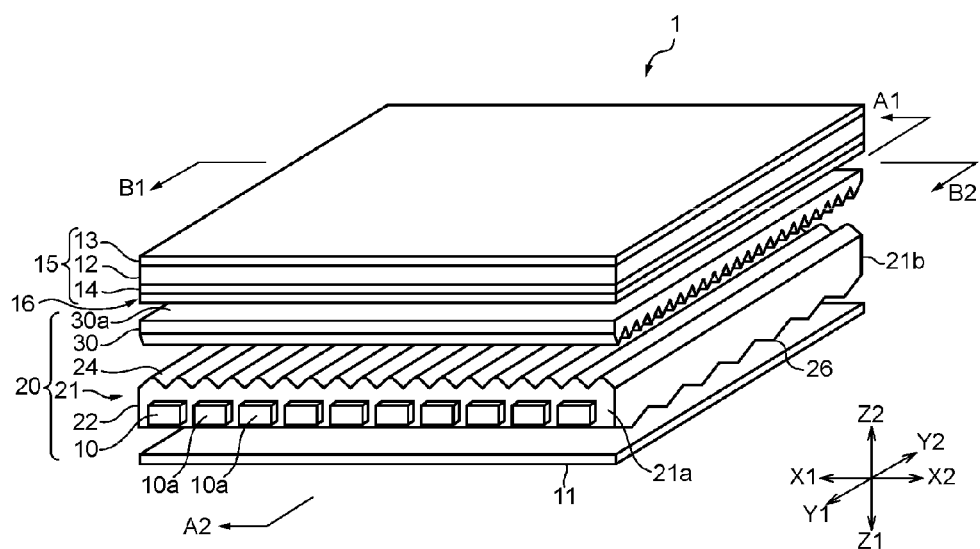
FIG. 1 is a schematic perspective view illustrating a liquid crystal display apparatus according to an embodiment of the present invention.

Note that, the respective drawings to be referred to below, which include FIG. 1, are schematic views, and sizes and shapes of the respective portions are exaggerated as appropriate in order to facilitate the understanding.

Moreover, words such as "plate", "sheet", and "film" are used. However, in general usage, the "plate", the "sheet", and the "film" are used in the stated order, which is a descending order of thickness, and also in this specification, are used in accordance with this order. However, such usage has no technical meaning, and accordingly, the word is unified as "sheet" for use in the description of the claims. Thus, it is defined that the words, the "sheet", the "plate", and the "film", can be replaced as appropriate. For example, a prism sheet may be expressed as a prism film or a prism plate.

Further, dimensional numeric values, material names and the like of the respective members, which are described in this specification, are merely examples, but without being limited thereto, may be selected as appropriate for use.

FIG. 1 is a view illustrating a liquid crystal display apparatus 1 according to an embodiment of the present invention. The liquid crystal display apparatus 1 of this embodiment includes a surface light source device 20 and a liquid crystal display panel 15 configured to be illuminated from a back surface thereof by the surface light source device 20. Note that, though a description or the like is omitted, in addition to those components, the liquid crystal display apparatus 1 includes usual devices, such as wires, circuits, and members, which are required in order to operate as a liquid crystal display apparatus.

Note that, in the drawings and the following description, in order to facilitate the understanding, in a usage state of the liquid crystal display apparatus 1, a direction perpendicular to a light guiding direction of light in a light guide plate is defined as an X direction, the light guiding direction of the light in the light guide plate is defined as a Y direction, and a normal direction of a viewing screen is defined as a Z direction. A viewer visually recognizes display of a screen of the liquid crystal display panel 15 from a Z2 side serving as a viewer side toward a Z1 side serving as a back surface side. Moreover, in a thickness direction (Z direction) of a prism sheet 30 and the liquid crystal display panel 15, the Z1 side is an incident side of the light, and the Z2 side is an output side of the light.

The liquid crystal display panel 15 is a transmission-type image display unit, and includes a first polarizing plate 13 arranged on the viewer side (output side, Z2 side), a second polarizing plate 14 arranged on the surface light source device 20 side (Z1 side), and a liquid crystal cell 12 arranged between the first polarizing plate 13 and the second polarizing plate 14. Each of the polarizing plates has functions to decompose light, which enters the polarizing plate, into two polarized light components perpendicular to each other, to transmit therethrough the polarized light component in one direction (direction parallel to a transmission axis), and to absorb the polarized light component in a direction (direction parallel to an absorption axis) perpendicular to the one direction. In this embodiment, the transmission axis of the second polarizing plate 14 and the transmission axis of the first polarizing plate 13 are substantially perpendicular to each other when viewed from a front direction of the liquid crystal display panel 15 (front direction of the viewing screen of the liquid crystal display apparatus 1). In this embodiment, for example, the transmission axis of the first polarizing plate 13 is in the X direction, and the transmission axis of the second polarizing plate 14 is in the Y direction. As described above, the X direction is the direction perpendicular to the light guiding direction of the light in the light guide plate, and is a right-and-left direction of the screen in the example of the figure. As described above, the Y direction is the light guiding direction of the light in the light guide plate, and is an up-and-down direction of the screen in the example of the figure. The transmission axis of the second polarizing plate 14 is substantially parallel to a light guiding direction of the light in a light guide plate 21 to be described later. Note that, in this specification, the expressions "substantially perpendicular" and "approximately perpendicular" include a case where an angle formed by two directions is 90°±10°, preferably 90°±7°, more preferably 90°±5°. The expressions "substantially parallel" and "approximately parallel" include a case where an angle formed by two directions is 0°±10°, preferably 0°+7°, more preferably 0°±5°. Moreover, in this specification, such a simple expression "perpendicular" or "parallel" can include a substantially perpendicular state or a substantially parallel state.

Figure 2:
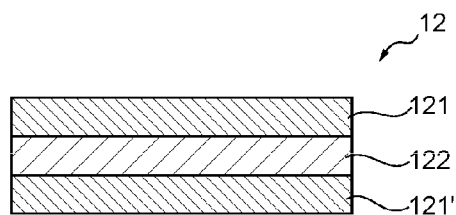
FIG. 2 is a schematic cross-sectional view of a liquid crystal cell for use in the liquid crystal display apparatus of FIG. 1.

Referring to FIG. 2, the liquid crystal cell 12 of this embodiment includes a pair of substrates 121 and 121' and a liquid crystal layer 122 as a display medium sandwiched between the substrates. In a general configuration, on the substrate 121 as one in the pair, a color filter and a black matrix are provided, and on the substrate 121' as the other in pair, there are provided switching elements for controlling electro-optical property of the liquid crystal, scanning lines for giving gate signals to the switching elements and signal lines for giving source signals thereto, and pixel electrodes and counter electrodes. An interval (cell gap) between the above-mentioned substrates 121 and 121' can be controlled by spacers and the like. On sides of the above-mentioned substrates 121 and 121', which are brought into contact with the liquid crystal layer 122, for example, alignment films made of polyimide or the like can be provided.

In one embodiment, the liquid crystal layer 122 includes liquid crystal molecules aligned in a homogeneous alignment in a state where an electric field is not present. The liquid crystal layer (liquid crystal cell as a result) as described above typically exhibits a three-dimensional refractive index of $nx>ny=nz$ in a case where refractive indices of the liquid crystal layer in a slow axis direction, a fast axis direction, and a thickness direction are $nx$, $ny$, and $nz$, respectively. Note that, in this specification, $ny=nz$ includes not only a case where ny and nz are completely the same, but also a case where ny and nz are substantially the same.

As a typical example of a drive mode using the liquid crystal layer that exhibits the three-dimensional refractive index as described above, the in-plane switching (IPS) mode, the fringe field switching (FFS) mode, and the like are given. In the above-mentioned IPS mode, by using the electrically controlled birefringence (ECB) effect, the liquid crystal molecules aligned in the homogeneous alignment in the state where an electric field is not present are allowed to respond, for example, to an electric field (also referred to as a horizontal electric field), which is generated by the counter electrode and pixel electrode, each being formed of metal, and is parallel to the substrates. More specifically, for example, as described in "Monthly Display, July" pp. 83 to 88 (1997), published by Techno Times Co., Ltd. and "Ekisho vol. 2, No. 4"pp. 303 to 316 (1998), published by The Japanese Liquid Crystal Society Publishing", when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned IPS mode includes the super in-plane switching (S-IPS) mode and the advanced super in-plane switching (AS-IPS) mode, each of which employs a V-shaped electrode, a zigzag electrode, or the like.

In the above-mentioned FFS mode, by using the electrically controlled birefringence effect, the liquid crystal molecules aligned in the homogeneous alignment in the state where no electric field is present are allowed to respond, for example, to an electric field (also referred to as a horizontal electric field), which is generated by the counter electrode and pixel electrode, each being formed of a transparent conductor, and is parallel to the substrates. Note that, the horizontal electric field in the FFS mode is also referred to as a fringe electric field. This fringe electric field can be generated by setting an interval between the counter electrode and the pixel electrode, each of which is formed of the transparent conductor, narrower than the cell gap. More specifically, for example, as described in "SID (Society for Information Display) 2001 Digest, pp. 484 to 487" and JP 2002-031812 A, when an alignment direction of the liquid crystal cell at the time when no electric field is applied thereto and an absorption axis of a polarizer on one side are allowed to coincide with each other, and the upper and lower polarizing plates are arranged perpendicularly to each other, the normally black mode provides completely black display in the state where no electric field is present. When the electric field is present, the liquid crystal molecules perform a rotation operation while remaining parallel to the substrates so that a transmittance corresponding to a rotation angle can be obtained. Note that, the above-mentioned FFS mode includes the advanced fringe field switching (A-FFS) mode and the ultra fringe field switching (U-FFS) mode, each of which employs a V-shaped electrode, a zigzag electrode, or the like.

In the drive mode (for example, the IPS mode, the FFS mode) using the liquid crystal molecules aligned in the homogeneous alignment in the state where no electric field is present, there is no oblique gray-scale inversion, and an oblique viewing angle thereof is wide, and accordingly, there is an advantage in that visibility in an oblique direction is excellent even when the surface light source directed in the front direction, which is used in the present invention, is used.

In another embodiment, the liquid crystal layer 122 includes liquid crystal molecules aligned in a homeotropic alignment in the state where no electric field is present. As a drive mode using the liquid crystal molecules aligned in the homeotropic alignment in the state where no electric field is present, for example, the vertical alignment (VA) mode is given. The VA mode includes the multi-domain VA (MVA) mode.

Figure 3A:
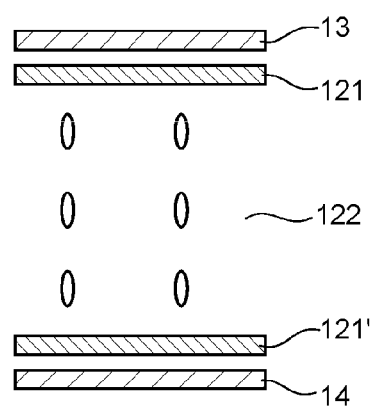
FIGS. 3(a) and 3(b) are schematic cross-sectional views illustrating alignment states of liquid crystal molecules in a VA mode.
Figure 3B:
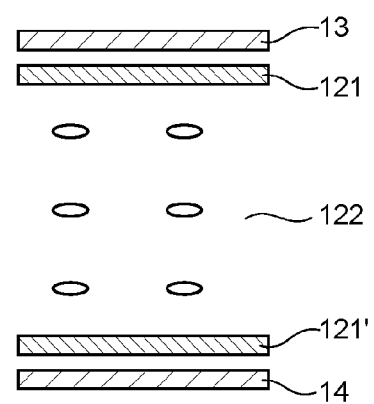

FIGS. 3(*a*) and 3(*b*) are schematic cross-sectional views illustrating alignment states of the liquid crystal molecules in the VA mode. As illustrated in FIG. 3(*a*), the liquid crystal molecules in the VA mode are aligned, at the time when no voltage is applied thereto, approximately vertically (normal direction) on the substrates 121 and 121'. Here, the term "approximately vertical" also includes a case where an alignment vector of the liquid crystal molecules is inclined with respect to the normal direction, that is, a case where the liquid crystal molecules have a tilt angle. The tilt angle (angle from the normal line) is preferably 10° or less, more preferably 5° or less, particularly preferably 1° or less. The liquid crystal molecules have the tilt angle in such a range so that the liquid crystal display apparatus can be excellent in contrast. Moreover, moving picture display characteristics can be enhanced. The approximately vertical alignment as described above can be realized, for example, by arranging nematic liquid crystal, which has negative dielectric anisotropy, between substrates on which vertical alignment films are formed. When light enters from a surface of the one-side substrate in such a state, light of linearly polarized light, which passes through the second polarizing plate 14 and enters the liquid crystal layer 122, travels along a direction of a major axis of the liquid crystal molecules aligned approximately vertically. The birefringence is not generated substantially in a major axis direction of the liquid crystal molecules, and accordingly, the incident light travels without changing a polarization direction thereof, and is absorbed by the first polarizing plate 13 having a transmission axis perpendicular to the second polarizing plate. In this manner, display of a dark state is obtained at the time when no voltage is applied (normally black mode). When a voltage is applied between the electrodes, the major axis of the liquid crystal molecules is aligned parallel to the substrate surfaces. The liquid crystal molecules in this state exhibit the birefringence to the light of the linearly polarized light, which passes through the second polarizing plate 14 and enters the liquid crystal layer, and the polarization state of the incident light is changed in response to an inclination of the liquid crystal molecules. The light that passes through the liquid crystal layer 122 at a time when a predetermined maximum voltage is applied becomes, for example, linearly polarized light in which a polarization direction is rotated by 90°, and accordingly, the light transmits through the first polarizing plate 13, and display of a bright state is obtained. When the state where no voltage is applied is set again, the display can be returned to the display of the dark state by alignment regulating force. Moreover, the inclination of the liquid crystal molecules is controlled by changing the applied voltage, and transmission intensity of the light from the first polarizing plate 13 is changed so that gray-scale display becomes possible. In the case of the VA mode, a transmittance in middle tones in the oblique direction is higher than a transmittance in middle tones in the front direction, and accordingly, there are advantages in that the middle tones viewed obliquely are bright even when the surface light source directed in the front direction, which is used in the present invention, is used, resulting in a small amount of blocked-up shadows.

FIGS. 4(*a*) and 4(*b*) are views illustrating a configuration of the surface light source device 20 of this embodiment. FIG. 4(*a*) is a cross-sectional view of the surface light source device 20 taken along the line indicated by the arrows A1-A2 in FIG. 1, and FIG. 4 (*b*) is a cross-sectional view of the surface light source device 20 taken along the line indicated by the arrows B1-B2 in FIG. 1. As illustrated in FIG. 1, the surface light source device 20 is a lighting device, which is arranged on the back surface side (Z1 side) with respect to the liquid crystal display panel 15, for illuminating the liquid crystal displaypanel 15 from the back surface side. As illustrated in FIG. 1 and FIGS. 4(*a*) and 4(*b*), the surface light source device 20 is an edge light-type surface light source device (backlight), which includes the light guide plate 21, a light source unit 10, the prism sheet 30, and a reflection sheet 11. The surface light source device 20 may be what is called a single lamp-type surface light source device, in which the light source unit 10 is arranged along one side surface (21*a* or 21*b* of FIG. 1) of the light guide plate 21, or may be what is called a dual lamp-type surface light source device, in which the light source unit 10 is arranged along two opposed side surfaces (21*a* and 21*b* of FIG. 1) of the light guide plate 21. As illustrated in FIG. 4(*a*), in this embodiment, the dual lamp-type surface light source device is illustrated. Note that, as illustrated in FIG. 1, the surface light source device 20 may adopt a form in which a polarized light selective reflection sheet 16 is provided between the prism sheet 30 and the liquid crystal display panel 15. The polarized light selective reflection sheet 16 transmits therethrough polarized light in a specific polarization state (polarization direction), and reflects light in other polarization states. The polarized light selective reflection sheet 16 is arranged so as to transmit therethrough light in a polarization direction parallel to a polarizing axis of the second polarizing plate 14, and can thereby reuse the light absorbed to the second polarizing plate 14, can further increase the utilization efficiency, and moreover, can enhance the brightness.

The light guide plate 21 is a member configured to guide the light, which enters from the light source unit 10, to an end side opposed to the light source unit 10 side while receiving a reflection action or the like in the light guide plate 21, and gradually output the light from a light output surface 21*d* (surface on the prism sheet 30 side) in the light guide process. The light guide plate 21 includes a base portion 22, a light output-side unit optical element portion 23, and a back surface-side unit optical element portion 25. The base portion 22 is a sheet-like member, and has light transmissivity.

Figure 4A:
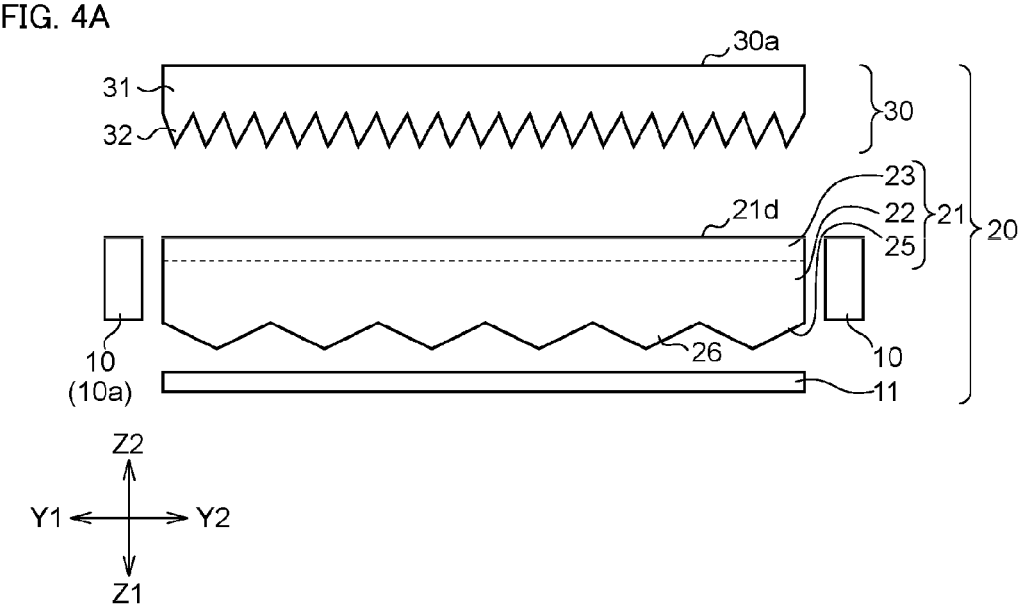
FIGS. 4(a) and 4(b) are schematic cross-sectional views illustrating configurations of a surface light source device in the liquid crystal display apparatus of FIG. 1.
Figure 4B:
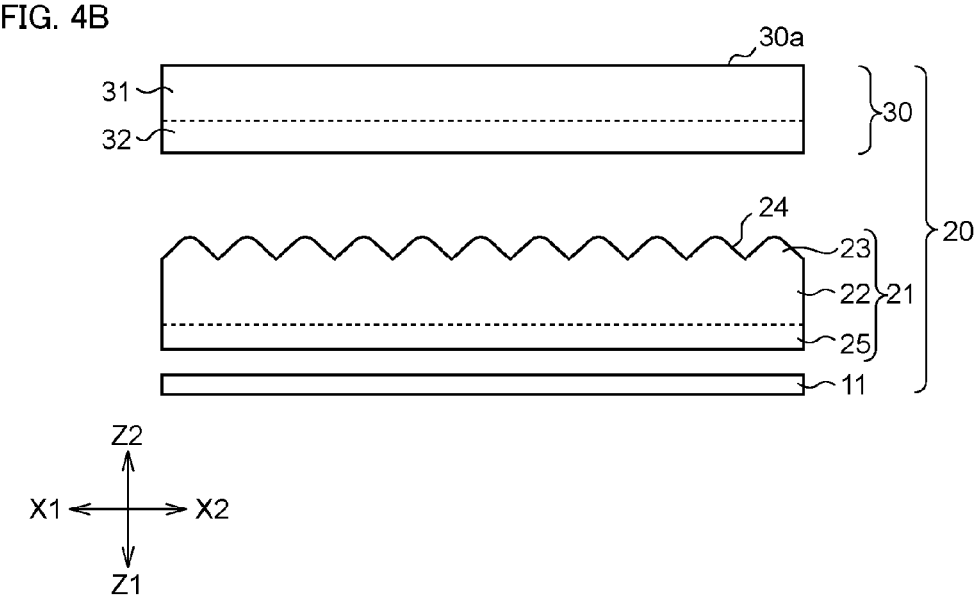

As illustrated in FIG. 1 and FIGS. 4(*a*) and 4(*b*), the light output-side unit optical element portion 23 is formed on a surface of the base portion 22 on the prism sheet 30 side (Z2 side). On the light output-side unit optical element portion 23, a plurality of light output-side unit optical elements 24 are arrayed in parallel to one another. The light output-side unit optical elements 24 are columnar, maintain a cross-sectional shape that appears on a cross section illustrated in FIG. 4(b), and define the direction (Y direction) of guiding light as a longitudinal direction. The plurality of light output-side unit optical elements 24 are arrayed in parallel to one another in a direction (X direction) perpendicular to this longitudinal direction.

Figure 5A:
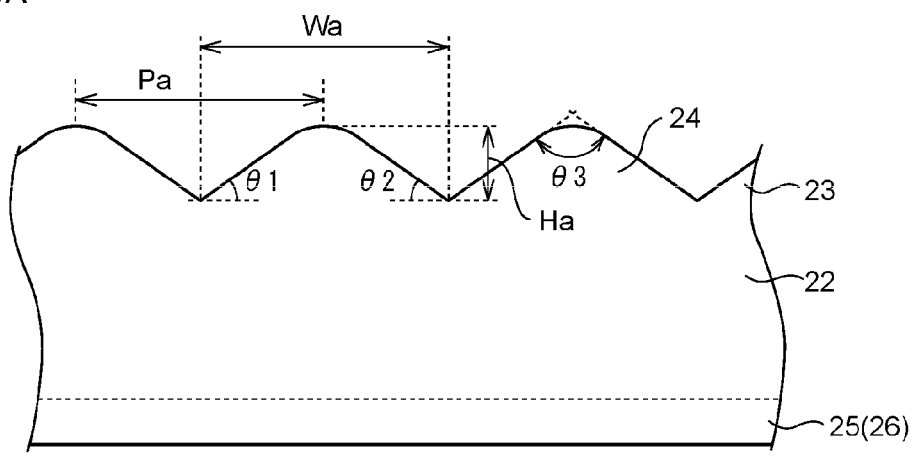
FIGS. 5(a) and 5(b) are schematic views illustrating shapes of a light output-side unit optical element and a back surface-side unit optical element of a light guide plate of the surface light source device of FIGS. 4(a) and 4(b).
Figure 5B:
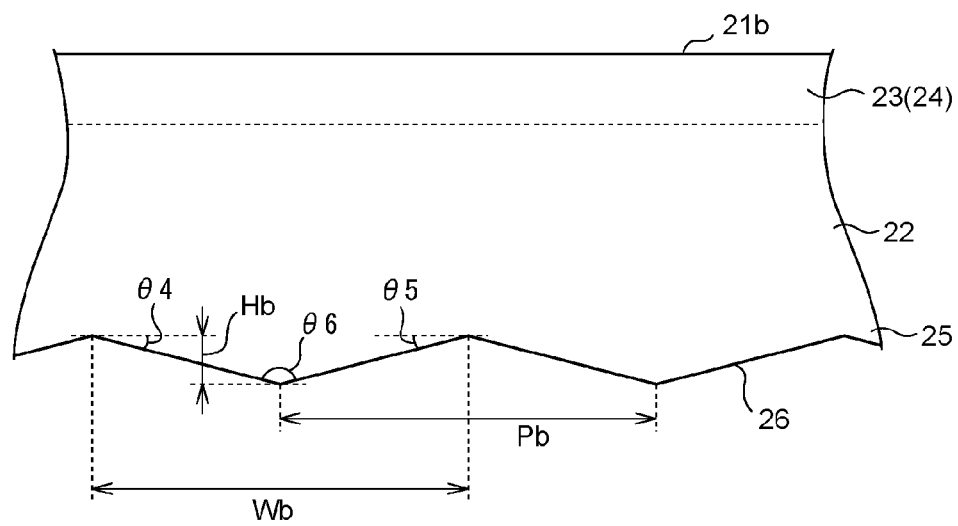

FIGS. 5(a) and 5(b) are views illustrating shapes of the light output-side unit optical elements 24 and the back surface-side unit optical elements 26 of the light guide plate 21 according to the embodiment. FIG. 5(a) illustrates a part of the light guide plate 21 having the cross section illustrated in FIG. 4(b) in an enlarged manner, and FIG. 5(b) illustrates a part of the light guide plate 21 having the cross section illustrated in FIG. 4(a) in an enlarged manner. As illustrated in FIG. 5(a), in the light output-side unit optical elements 24, on a cross section (XZ cross section), which is parallel to a parallel-array direction thereof and perpendicular to a thickness direction thereof, a cross-sectional shape thereof is a triangular shape, which has a base on one side surface of the base portion 22 and has a protrusion shape protruding from the base portion 22. In the light output-side unit optical elements 24 of this embodiment, an example where a vertex opposed to each of the bases has a curved shape is illustrated. However, the light output-side unit optical elements 24 may adopt a form of having not the curved shape but sharp corner portions, and moreover, the bases thereof may be curved. As illustrated in FIG. 5(a), in the light output-side unit optical elements 24, a parallel pitch thereof is Pa, a width of the base portion 22 side in the parallel-array direction (that is, a length of the base of the triangular shape in cross section) is Wa, a height (dimension in the thickness direction) of the light output-side unit optical elements 24 is Ha, a vertex angle of the triangular shape in cross section is θ3, and angles other than the vertex angle are θ1 and θ2. Typically, the parallel pitch Pa is equal to the length Wa of the base.

It is preferred that the cross-sectional shape of the light output-side unit optical elements 24, which is illustrated in FIG. 4(b) and FIG. 5(a), satisfy at least one of the following condition A and condition B.

Condition A: the angles θ1 and θ2 of base angles located on the base portion 22 triangular in cross section, which serve as angles other than the vertex angle θ3, are 25° or more to 45° or less.

Condition B: A ratio (Ha/Wa) of a height Ha of the base to the length Wa is 0.2 or more to 0.5 or less.

In a case where at least one of the condition A and the condition B is satisfied, among the light output from the light guide plate 21, components along the parallel-array direction (X direction) of the light output-side unit optical elements 24 can be enhanced in condensing function in the normal direction of the light output surface 21d of the light guide plate 21 while allowing the light guide plate 21 to have polarization property. As a result, in polarized light (first directivity light L1: described later) output from the light guide plate, a ratio of a polarized light component that oscillates in a predetermined plane can be increased.

On the cross section (cross section along the direction where the light output-side unit optical elements 24 are arrayed in parallel to one another) that appears in FIG. 4(b) and FIG. 5(a), it is preferred that the light output-side unit optical elements 24 of this embodiment have an isosceles triangular shape, and that the angles θ1 and θ2 be equal to each other. By adopting such a form as described above, the brightness in the front direction can be effectively increased, and symmetry can be imparted to an angle distribution of the brightness in a plane along the parallel-array direction (X direction) of the light output-side unit optical elements 24.

Note that, the "triangular shape" in this specification includes not only a triangular shape in a strict sense but also an approximately triangular shape including limitations in the manufacturing technology, an error at a molding time, and the like. Moreover, in a similar manner, terms, which are used in this specification and specify other shapes and geometrical conditions, for example, terms such as "ellipsoid" and "circle" are not restricted to strict senses thereof, and are interpreted to include errors to an extent that similar optical functions can be expected.

As illustrated in FIG. 1, on the back surface side (Z1 side) of the light guide plate 21, the back surface-side unit optical element portion 25 is formed. On the back surface-side unit optical element portion 25, a plurality of the back surface-side unit optical elements 26 are formed to be arrayed in parallel to one another. The back surface-side unit optical elements 26 are columnar, maintain a cross-sectional shape that appears on a cross section illustrated in FIG. 4(a) and FIG. 5(b), and define the direction (X direction) perpendicular to the light guiding direction of the light in the light guide plate as a longitudinal direction. The plurality of back surface-side unit optical elements 26 are arrayed in parallel to one another in the light guiding direction (Y direction) of the light in the light guide plate. An array direction of the back surface-side unit optical elements 26 is substantially parallel to the transmission axis of the above-mentioned second polarizing plate 14. As illustrated in FIG. 5(b), in each of the back surface-side unit optical elements 26, on a cross section (YZ plane), which is approximately parallel to a parallel-array direction (Y direction) thereof and perpendicular to a thickness direction (Z direction) thereof, a cross-sectional shape thereof is a triangular shape (wedge shape), which has a base on the back surface-side (Z1 side) surface of the base portion 22 and has a protrusion shape protruding from the base portion 22 to the back surface side (Z1 side). In the back surface-side unit optical elements 26 of this embodiment, an example where a vertex of each thereof has a corner with an obtuse angle is described. However, the back surface-side unit optical elements 26 are not limited to this, and for example, an apex thereof may have a curved shape protruding to the back surface side.

As illustrated in FIG. 5(b), the back surface-side unit optical elements 26 have a parallel pitch of Pb, a width (that is, a length of the base of the triangular shape in cross section) of the base portion 22 side in the parallel-array direction of Wb, a height (dimension in the thickness direction) of the back surface-side unit optical elements 26 of Hb, a vertex angle of the triangular shape in cross section of θ6, and angles other than the vertex angle of θ4 and θ5. This parallel pitch Pb is equal to the length Wb of the base. A cross-sectional shape of the back surface-side unit optical elements 26 may be a symmetrical shape or an asymmetrical shape on the cross section, which is parallel to the array direction and parallel to the thickness direction. FIG. 5(b) illustrates the cross-sectional shape of the back surface-side unit optical elements 26 for use in the dual lamp-type surface light source device. In this case, it is preferred that the cross-sectional shape be a symmetrical shape on the cross section, which is parallel to the array direction and parallel to the thickness direction. More specifically, the cross-sectional shape of the back surface-side unit optical elements 26 illustrated in FIG. 5(b) is an isosceles triangular shape, and the base angles θ4 and θ5 are set equal to each other. Meanwhile, in a case where the back surface-side unit optical elements 26 are used for the single lamp-type surface light source device, the cross-sectional shape of the back surface-side unit optical elements 26 may be set, for example, to be an asymmetrical triangular shape as illustrated in FIG. 6(b) to be described later. In this case, it is preferred for the base angles θ4 and θ5 that the base angle located on the light source unit 10 side in the array direction of the back surface-side unit optical elements 26 become larger than the other base angle from a viewpoint of efficiently guiding and outputting light. The back surface-side unit optical elements 26 as described above are provided so that the light from the light source unit 10 can be efficiently guided and output in the light guide plate 21, and evenness in brightness in the plane along the parallel-array direction (Y direction) of the back surface-side unit optical elements 26 and the like can be enhanced. Moreover, a diffusion function received by the light output from the light guide plate 21 can be reduced as much as possible.

An example of dimensions of the respective portions of the light guide plate 21 is described below.

In the light output-side unit optical elements 24, the width Wa of a bottom portion thereof may be set at 20 μm to 500 μm, and the height Ha may be set at 4 μm to 250 μm or less. Moreover, the vertex angle θ3 of the light output-side unit optical elements 24 may be set at 90° to 125° or less.

A thickness of the base portion 22 may be set at 0.25 mm to 10 mm, and an entire thickness of the light guide plate 21 may be set at 0.3 mm to 10 mm.

In the back surface-side unit optical elements 26, the with Wb of a bottom portion thereof may be set at 20 μm to 500 μm, and the height Hb may be set at 1 μm to 10 μm. Moreover, the vertex angle θ6 of the back surface-side unit optical elements 26 may be set at 176.0° to 179.6°.

The light guide plate 21 is capable of manufacturing, by, for example, extrusion, or shaping the light output-side unit optical elements 24 and the back surface-side unit optical elements 26 on a base serving as the base portion 22, the base portion 22 integrally with the light output-side unit optical element portion 23 and the back surface-side unit optical element portion 25. In a case of manufacturing the light guide plate 21 by the extrusion, the light output-side unit optical element portion 23 and the back surface-side unit optical element portion 25 may use the same resin material as a material serving as a parent material of the base portion 22, or may use a different material therefrom.

As the material serving as the parent material of the base portion 22 of the light guide plate 21, and as a material for forming the light output-side unit optical elements 24 and the back surface-side unit optical elements 26, various materials can be used as long as the materials can transmit light therethrough efficiently. For example, materials, which are available inexpensively as well as are widely used for optical use and have excellent mechanical property, optical property, stability, processability, and the like, can be used, and a transparent resin that contains, as a main component, one or more of an acrylic resin such as polymethyl methacrylate (PMMA), a styrene resin, a polycarbonate (PC) resin, polyethylene terephthalate (PET) resin, acrylonitrile, and the like, epoxy acrylate-based and urethane acrylate-based reactive resins (ionizing radiation curable resin and the like), glass, and the like can be used.

As illustrated in FIG. 1 and FIG. 4(a), the light source unit 10 is arranged at a position opposed to one surface or at positions opposed to both surfaces, the surfaces being a pair of the side surfaces 21a and 21b, which serve as both ends of the light output-side unit optical elements 24 in the longitudinal direction (Y direction), among two pairs of the plate-like side surfaces of the base portion 22 of the light guide plate 21, each pair including the side surfaces opposed to each other. The light source unit 10 is arranged along that surface. In this embodiment, there is described an example where, as illustrated in FIG. 1 and FIG. 4(a), the light source unit 10 is provided at positions, which face to the two side surfaces 21a and 21b of the light guide plate 21, along the side surfaces 21a and 21b. It is preferred that this light source unit 10 be a light emitting source such as a light emitting diode (LED), which emits light with high directivity. The light source unit 10 of this embodiment includes a plurality of point light sources 10a arrayed therein, and the point light sources 10a are LEDs. This light source unit 10 is adjustable in an output of each of the point light sources (LEDs) 10a, that is, turning on and off of each of the point light sources 10a, brightness thereof at a turning-on time, and the like by a control device (not shown) independently of outputs of other point light sources.

On the back surface side of the light guide plate 21, the reflection sheet 11 is provided. This reflection sheet 11 has a function to reflect the light output from the back surface side and the like of the light guide plate 21 and to return the light into the light guide plate 21. As this reflection sheet 11, for example, there can be used a sheet formed of a material such as metal, which has a high reflectance (for example, a regular-reflective silver foil sheet, one formed by depositing aluminum and the like on a thin metal plate), a sheet including, as a front surface layer, a thin film (for example, a metal thin film) formed of a material having a high reflectance (for example, a sheet formed by depositing silver on a PET base), a sheet having a specular reflectivity by stacking a large number of two or more types of thin films different in refractive index, a white foamed PET (polyethylene terephthalate) sheet having a diffusion reflectivity, and the like. From a viewpoint of enhancing the light condensing property and the utilization efficiency of the light, it is preferred to use a reflection sheet, which enables the so-called specular reflection, such as the sheet formed of the material such as metal, which has a high reflectance, and the sheet including, as the front surface layer, the thin film (for example, a metal thin film) formed of the material having a high reflectance. It is estimated that the reflection sheet, which enables the specular reflection, allows the light to perform the specular reflection so that the directivity of the light is not lost, and as a result, the polarization direction of the output light is maintained. Accordingly, the reflection sheet 11 can also contribute to realization of a desired distribution of the output light.

Figure 6A:
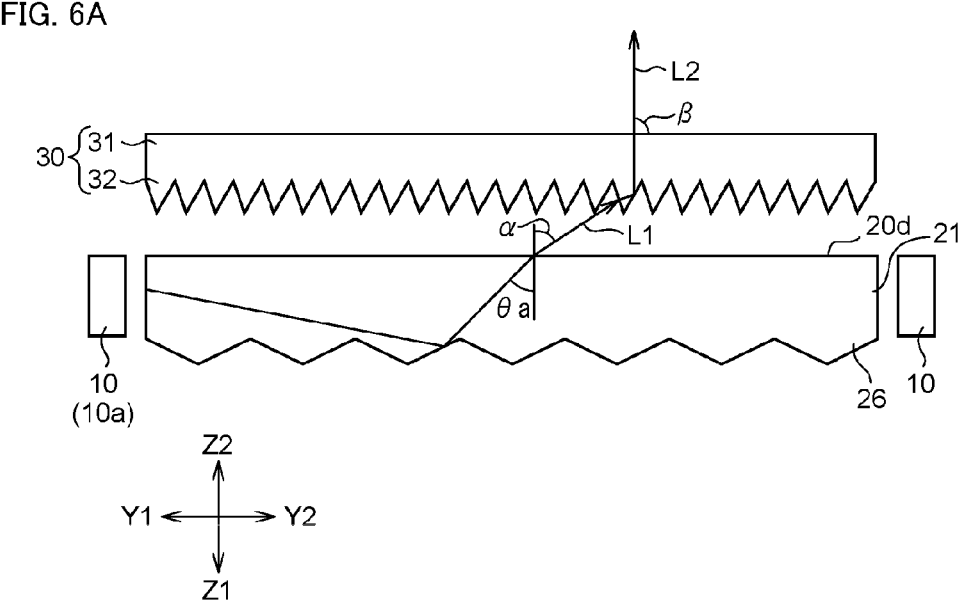
FIGS. 6(a) and 6(b) are views illustrating states of light output from the light guide plate and a prism sheet.
Figure 6B:
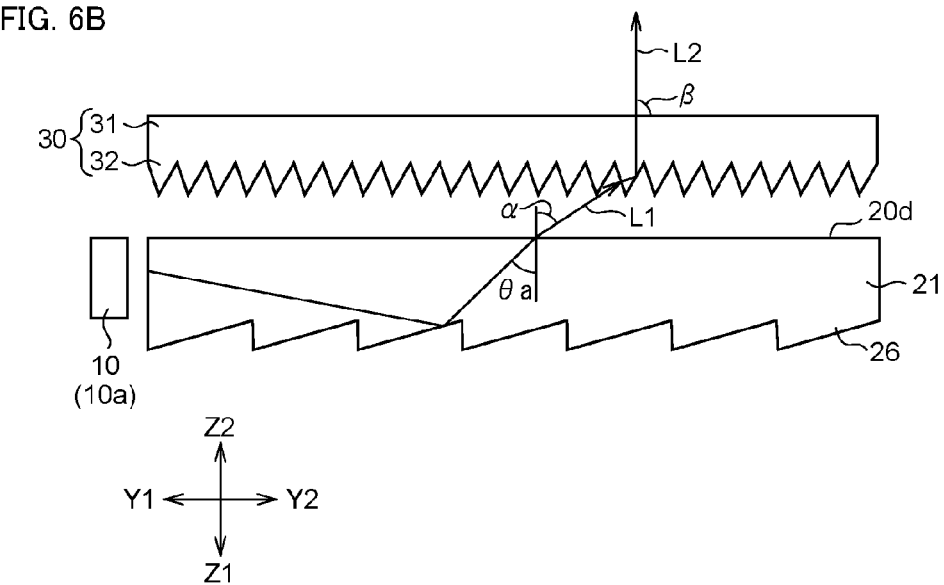

FIGS. 6(a) and 6(b) are views illustrating states of output light from the light guide plate 21 and the prism sheet 30. FIG. 6(a) is a view illustrating a case of the above-mentioned dual lamp-type surface light source device, and FIG. 6(b) is a view illustrating a single lamp-type surface light source device for reference. The light guide plate 21 has such a configuration as described above, and the light output from the light output surface 21d (surface on the prism sheet 30 side) becomes light, which has directivity having maximum intensity in a predetermined direction, and has a predetermined half width (this light is hereinafter referred to as first directivity light L1 in some cases). In FIG. 6(a), the light source unit 10 is arranged on the side surfaces 21a and 21b of the light guide plate 21, and a main light guiding direction of the light from the light source unit 10 is the Y direction. In this case, the light guide plate 21 has such a configuration as described above, and hence an output direction and a polarization state of the light that propagates through the light guide plate 21 are controlled by functions to be described later. As a result, as illustrated in FIG. 6(a), the light output from the light guide plate 21 becomes polarized light that has the maximum intensity (peak) in a direction (hereinafter referred to as a first direction in some cases) that forms an angle α toward the side surface 21b side with respect to the normal direction of the light output surface 21d on the YZ plane. In the example of the figure, the angle α of this embodiment is approximately 73°. The light guide plate is designed as appropriate so that any appropriate angle α can be realized depending on the purpose. For example, the angle α may be 65° to 80°. Note that, regardless of whether the light guide plate 21 for use in the present invention is the single lamp-type light guide plate or the dual lamp-type light guide plate, the control for the output direction and the polarization state can be realized favorably.

Moreover, the light guide plate 21 of this embodiment has characteristics of outputting polarized light in which a ratio of a polarized light component that oscillates in the plane (in the YZ plane) in a direction parallel to the light guiding direction of the light is high. That is, the first directivity light becomes polarized light in which the ratio of the polarized light component that oscillates in the YZ plane is high. In the following, in some cases, the polarized light component that oscillates in the YZ plane is referred to as a P component, and a polarized light component that oscillates in a plane (XY plane), which is parallel to the light guiding direction of the light and perpendicular to the YZ plane, is referred to as an S component. Accordingly, the polarization direction (oscillation direction) of the P component becomes approximately parallel to the transmission axis direction (Y direction) of the second polarizing plate 14. As described later, the prism sheet 30 outputs second directivity light, which has maximum intensity in the second direction (normal direction), while maintaining the polarization state of the first directivity light, and accordingly, the second directivity light also becomes polarized light in which the ratio of the P component is high. As a result, the light absorbed by the second polarizing plate can be reduced, and accordingly, the bright liquid crystal display apparatus, in which the utilization efficiency of the light is high, can be obtained.

Note that, a principle that the light guide plate 21 guides the light uses a phenomenon that the light causes the total reflection when an incident angle θa reaches θc in the following Expression 1 on an interface between mediums that are optically dense (refractive index n1) and thin (refractive index n2), and θc refers to a critical angle.

$$\sin \theta c = n2/n1 \quad \text{(Expression 1)}$$

The light guided in the light guide plate 21 is output from the light guide plate 21 when the incident angle θa with respect to the light output surface 21d by the total reflection in the back surface-side unit optical elements 26 becomes smaller than this critical angle θc.

Figure 7A:
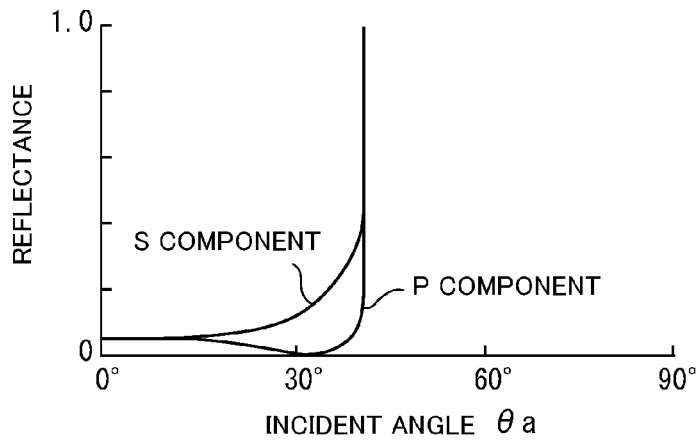
FIGS. 7(a) to 7(c) are graphs showing various relationships among an incident angle, a P component, and an S component.
Figure 7B:
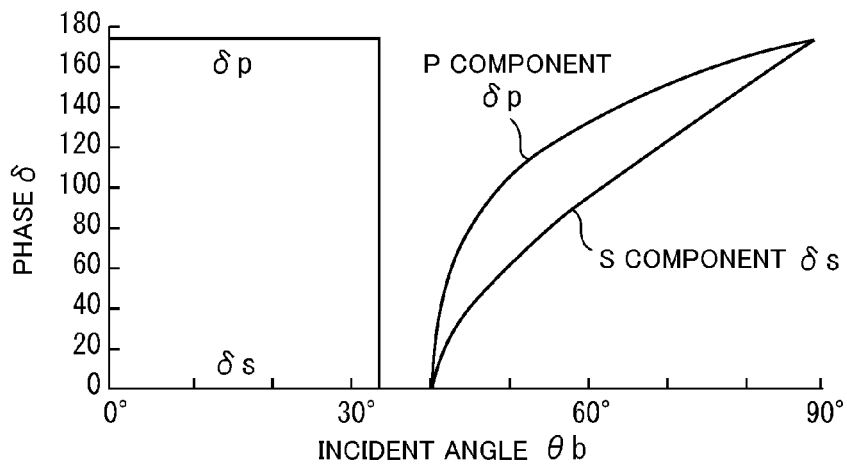
Figure 7C:
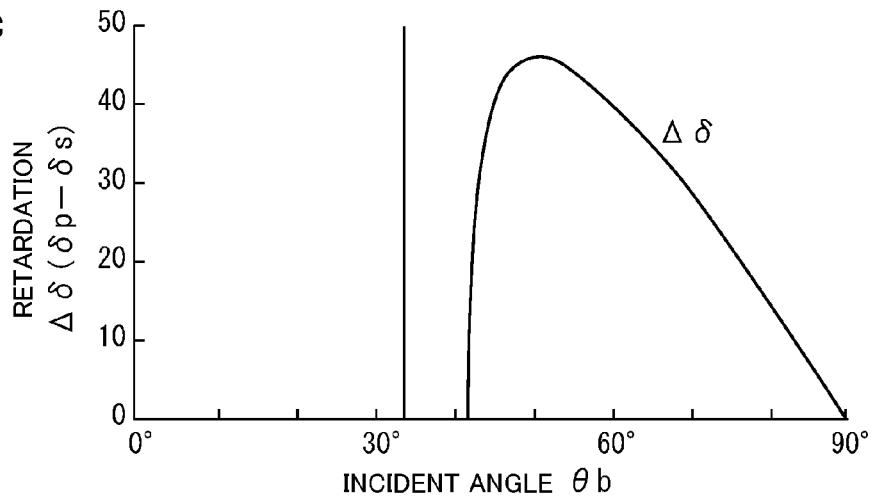

FIGS. 7(a) to 7(c) are graphs showing various relationships among the incident angle, the P component, and the S component. As shown in FIG. 7(a), in a region where the incident angle is slightly smaller than the critical angle, in light of the P component and light of the S component, a reflectance of the light of the P component becomes smaller than a reflectance of the light of the S component. Accordingly, the light reflected in the inside of the light output surface 21d of the light guide plate 21 may be set to be polarized light in which a ratio of the S component is high, and the light output from the light output surface 21d may be set to be polarized light in which a ratio of the P component is high. For example, when n1=1.5 and n2=1.0, in a case where θa=33° 41'24", the reflectance of the P component becomes 0, the light of the P component is output from the light output surface of the light guide plate 21, and the reflected light may be set to be polarized light that includes only the S component. As a result, polarized light in which an amount of the P component is large is output from the light output surface 21d of the light guide plate 21.

In this embodiment, the refractive index of the light guide plate 21 and the base angles θ4 and θ5 of the back surface-side unit optical elements 26 are set so that the incident angle ea with respect to the light output surface 21d may be slightly smaller than the critical angle θc. By adopting such a form, the light output from the light guide plate 21 is output as the polarized light in which the amount of P component is large. In addition, the incident angle θa is set in the specific small region, and accordingly, a light output angle is also limited to a specific small region. That is, the polarized light in which the ratio of the P component is high, and having the maximum intensity in the first direction (direction of an output angle α), can be output as the first directivity light L1 from the light output surface 21d.

Such light (first directivity light L1) output from the light guide plate 21 contains the P component, preferably by 52% or more, more preferably 55% or more. The first directivity light L1 has such property so that the light absorbed by the second polarizing plate can be reduced. Thus the bright liquid crystal display apparatus, in which the utilization efficiency of the light is high, can be obtained. Note that, an upper limit of the ratio of the P component is ideally 100%, is 60% in one embodiment, and is 57% in another embodiment.

Next, a description is made of the prism sheet 30. As illustrated in FIG. 1 and FIGS. 4(a) and 4(b), the prism sheet 30 includes a base portion 31 formed into a sheet shape, and a prism portion 32 provided on a surface (light incident surface) of the base portion 31 on the light guide plate 21 side (Z1 side). This prism sheet 30 converts the first directivity light L1, which enters from the light guide plate 21 and has the maximum intensity in the first direction, into the second directivity light L2, which has maximum intensity in the second direction that is an approximately normal direction (where the angle ρ in FIGS. 6(a) and 6(b) is approximately 90°) of a light output surface 30a of the prism sheet 30, by a total reflection in an inside of each of unit prisms 33, and the like while maintaining the polarization state of the first directivity light L1. Then, the prism sheet 30 outputs the second directivity light L2 from the light output surface 30a. As described above, the "first directivity light having the maximum intensity in the first direction" means light that has an intensity distribution in which a peak of the maximum intensity of the intensity distribution of the brightness is located in the first direction, and in this case, the first directivity light corresponds to the light output from the light guide plate 21. Moreover, the "approximately normal direction" includes directions within a predetermined angle from the normal direction, for example, directions within a range of ±10° from the normal direction.

The base portion 31 is a sheet-like member, in which the prism portion 32 is integrally formed on the light guide plate 21 side (Z1 side), and is a member that becomes a support of the prism portion 32. A surface of this base portion 31 on an opposite side (Z2 side) to the light guide plate 21 side becomes the light output surface 30a. The light output surface 30a of this embodiment is formed as a flat and smooth surface. The base portion 31 is a member with a film shape or the like, which is used for a surface light source device mechanism of a usual optical display or liquid crystal display.

It is preferred that the base portion 31 substantially have optical isotropy. In this specification, "substantially have optical isotropy" refers to that a retardation value is small to an extent of not substantially affecting the optical characteristics of the liquid crystal display apparatus. For example, an in-plane retardation Re of the base portion 31 is preferably 20 nm or less, more preferably 10 nm or less. When the in-plane retardation remains within such a range, the first directivity light output from the light guide plate can be output as the second directivity light in a predetermined direction without substantially changing the polarization state of the first directivity light (while maintaining the ratio of the P component). Note that, the in-plane retardation Re is a retardation value in the plane, which is measured by light with a wavelength of 590 nm at 23° C. The in-plane retardation Re is represented by $Re=(nx-ny) \times d$. In this case, nx is a refractive index in a direction where the refractive index becomes maximum in a plane of an optical member (that is, the direction is the slow axis direction), ny is a refractive index in a direction perpendicular to the slow axis direction in the plane (that is, the direction is the fast axis direction), and d is a thickness (nm) of the optical member.

In another embodiment of the present invention, the base portion 31 may have the in-plane retardation value. The in-plane retardation Re of the base portion 31 differs significantly depending on a thickness thereof. The in-plane retardation Re is 100 nm to 10,000 nm, for example. In this embodiment, the base portion 31 only needs to be arranged so that the slow axis thereof and the transmission axis of the second polarizing plate can be perpendicular or parallel to each other.

Moreover, a photoelastic coefficient of the base portion 31 is preferably $-10 \times 10^{-12}$ m$^2$/N to $10 \times 10^{-12}$ m$^2$/N, more preferably $-5 \times 10^{-12}$ m$^2$/N to $5 \times 10^{-12}$ m$^2$/N, still more preferably, $-3 \times 10^{-12}$ m$^2$/N to $3 \times 10^{-12}$ m$^2$/N. When the photoelastic coefficient remains within such a range, there is an advantage in that the in-plane retardation is hardly increased even when a stress due to a volume change of the base portion is generated in a temperature range (0° C. to 50° C.) and a humidity range (0% to 90%) at which the liquid crystal display apparatus is assumed to be used in general, and moreover, the in-plane retardation is hardly increased in a similar manner even when a stress caused after the base portion is fixed and attached by a general method is applied, thereby obtaining stable characteristics of the surface light source device.

As a material for forming the base portion 31, it is preferred to use a colorless and transparent material having transmission performance in the entire visible light wavelength range. Moreover, in a case of forming the prism on the base portion 31 by using the ionizing radiation curable resin, it is preferred to use a material further having ionizing radiation transmission property. For example, it is preferred to use a film formed of TAC (cellulose triacetate), an acrylic resin such as PMMA, or a PC resin, and it is more preferred to use an unstretched film from a viewpoint of imparting the optical isotropy. Moreover, it is preferred that a thickness of the base portion 31 be 25 μm to 300 μm in terms of handling easiness and strength thereof. Note that, the ionizing radiation means a radiation such as ultraviolet rays and electron beams, which has an energy quantum capable of crosslinking or polymerizing molecules.

As illustrated in FIG. 1 and FIGS. 4(*a*) and 4(*b*), in the prism portion 32, on a surface of the base portion 31 on the light incident side (Z1 side), a plurality of the unit prisms 33 are formed to be arrayed in parallel along a sheet surface thereof. The plurality of unit prisms 33 are columnar, define, as a longitudinal direction, a direction (X direction) perpendicular to the light guiding direction of the light in the light guide plate, are extended in the longitudinal direction while maintaining a predetermined cross-sectional shape, and are arrayed in parallel in the light guiding direction (Y direction) of the light in the light guide plate. In this case, in each of optical sheets and the like, the sheet surface refers to a surface along a plane direction of a sheet when the entire sheet is viewed. The sheet surface is used as the same definition in this specification and the claims. For example, the sheet surface of the prism sheet 30 is a surface along a plane direction of the prism sheet 30 when the entire prism sheet 30 is viewed. The sheet surface of the prism sheet 30 is a surface parallel to the light output surface 30*a* of the prism sheet 30, and is a surface substantially parallel to the viewing screen of the liquid crystal display panel 15.

The longitudinal direction (ridge line direction) of the unit prisms 33 may be directed to such a direction approximately perpendicular to the transmission axis of the second polarizing plate 14 of the liquid crystal display panel 15 when the display apparatus 1 is viewed from the front direction (Z direction). That is, on the surface parallel to the display surface of the display apparatus 1, a parallel-array direction of the unit prisms 33 may be set approximately parallel to the transmission axis of the second polarizing plate 14 of the liquid crystal display panel 15. Moreover, at this time, the longitudinal direction (ridge line direction) of the unit prisms 33 is approximately perpendicular to the longitudinal direction (ridge line direction) of the light output-side unit optical elements 24 of the light guide plate 21 when the display apparatus 1 is viewed from the front direction (Z direction).

Note that, as described above, the ridge line directions and/or the axial directions of the respective members in the liquid crystal display apparatus of this embodiment are typically approximately perpendicular or approximately parallel to each other. However, in some cases, the respective members interfere with each other to generate moire depending on a matrix of the liquid crystal layer and on a pitch and array of the unit optical elements of the prism sheet or the light guide plate. In that case, the ridge line direction of the unit prisms 33 and/or the ridge line directions of the light output-side unit optical elements 24 and/or the back surface-side unit optical elements 26 of the light guide plate 21 are arranged obliquely within a predetermined range when the display apparatus 1 is viewed from the front direction (Z direction) so that it is possible to avoid the moire. The range of such oblique arrangement is preferably 20° or less, more preferably 5° or less. When the arrangement falls over this range, directivity of the light, which is described later, is affected in some cases.

Figure 8:
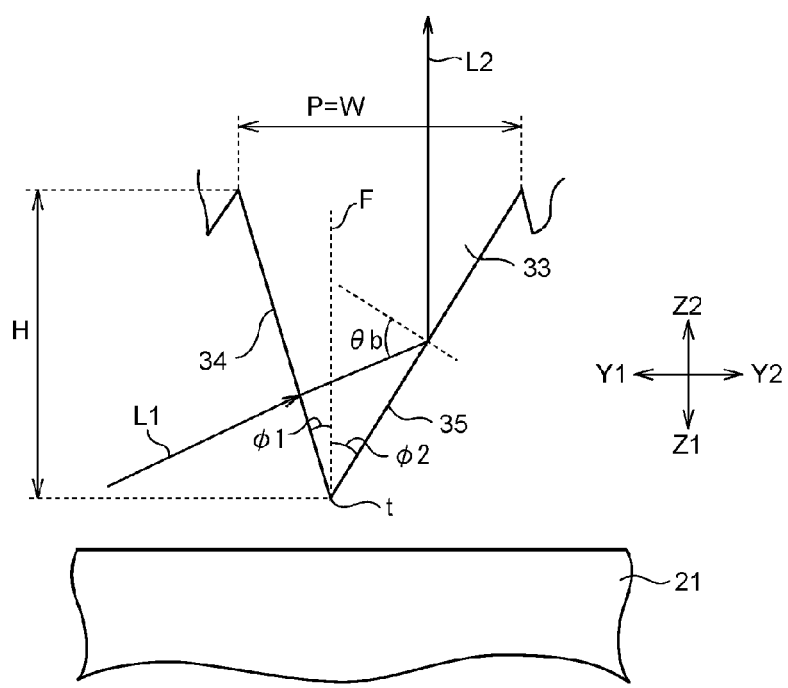
FIG. 8 is a schematic view illustrating a unit prism of the prism sheet of the surface light source device of FIGS. 4(a) and 4(b).

FIG. 8 is a view illustrating the prism portion 32 of the prism sheet 30 of this embodiment. FIG. 8 is a view enlargedly illustrating a part of the cross section illustrated in FIG. 4(*a*). As illustrated in FIG. 8, the unit prism 33 of this embodiment has a shape protruding from a surface of the base portion 31 on the light guide plate 21 side to the light guide plate 21 side (Z1 side), and a width of the unit prism 33 in a direction parallel to the sheet surface of the base portion 31 is becoming smaller as being spaced apart from the base portion 31 along the normal direction (Z direction) of the base portion 31.

As illustrated in FIG. 8, the unit prism 33 of this embodiment is a so-called triangular column prism, in which a cross-sectional shape on a cross section parallel to the array direction (Y direction) and parallel to the thickness direction (Z direction) is a triangular shape. The cross-sectional shape of the unit prism 33 illustrated in FIG. 8 is a scalene triangle in which a first inclined surface 34 located on the light source unit 10 side in the array direction of the unit prism 33 is formed as a steeper inclined surface than a second inclined surface 35 on the other side. At this time, when an angle (incident surface angle) formed by the first inclined surface 34 and a normal F of the sheet surface of the prism sheet 30 is defined as φ1, and an angle (reflecting surface angle) formed by the second inclined surface 35 and the normal F of the sheet surface of the prism sheet 30 is defined as φ2, φ1<φ2. This is in order to direct the first directivity light L1, which is output from the light guide plate 21 while having a peak in the first direction, toward an approximately normal direction (second direction) of the light output surface 30a.

A pitch of this unit prism 33 is P, and a width thereof on a base portion 31 side in the cross-sectional shape is W. The pitch P of this embodiment is equal to the width W. Moreover, a height of the unit prism 33 (that is, a dimension from a point that is a root between the unit prisms 33 in the thickness direction to a vertex t) is H.

A description is made below of a behavior of the light that enters the unit prism 33. Note that, in FIG. 8 and FIG. 9 to be described later, for description convenience, as the behavior of the light, representative light beams corresponding to the respective components of the light are indicated by the arrows, and aspect ratios, dimensional ratios between the respective layers, and the like are appropriately changed from those of the actual dimensions and are illustrated exaggeratedly.

The first directivity light L1, which is output from the light guide plate 21 and has the maximum intensity in the first direction, travels straight through an air layer (refractive index: approximately 1.0), thereafter enters the first inclined surface 34 of the unit prism 33, travels approximately straight through the unit prism 33, is totally reflected on the second inclined surface 35, and is output as the second directivity light L2 having the maximum intensity in the direction (second direction) approximately perpendicular to the light output surface 30a (sheet surface) in the array direction of the unit prism 33. At this time, a bias of the polarization direction in the first directivity light L1 is also maintained in the second directivity light L2. Accordingly, it becomes possible to impart directivity, which is strong in the normal direction of the sheet surface, to the light reflected on the second inclined surface 35, and in comparison with a case where the directivity as described above is not imparted, absorption of the light by the black matrix of the liquid crystal display panel 15 is suppressed, and the utilization efficiency of the light can be enhanced. Moreover, even the strong directivity is imparted to the light, the polarization direction of the light is not varied. Further, the first inclined surface 34 and the second inclined surface 35 include flat surfaces. Thus, it becomes easy to ensure shape accuracy thereof, and accordingly, quality control thereof is easy, and the mass productivity can be enhanced.

An inclination angle of the first inclined surface 34 of the unit prism 33 illustrated in FIG. 8 is appropriately adjusted depending on the direction (first direction; output angle: a) where the first directivity light L1 has the maximum intensity. In general, the angle φ1 formed by the first inclined surface 34 and the normal F of the light output surface 30a (sheet surface) of the prism sheet 30 is 30° to 37°. Moreover, an inclination angle of each flat surface of the second inclined surface 35 is adjusted so that the first directivity light L1 can be converted into, by internal reflection thereof, the second directivity light L2 having the maximum intensity in the normal direction of the light output surface 30a (sheet surface) of the prism sheet 30. The angle φ2 formed by each flat surface of the second inclined surface 35 with the normal F is appropriately adjusted depending on a predetermined direction where the first directivity light L1 has the maximum intensity, and in usual, is 30° to 37°, and preferably satisfy φ2>φ1. The height H of the unit prism 33 is changed depending on the pitch P of the unit prism 33. However, in a case where the pitch P is 50 µm, the height H is 30 µm to 45 µm in usual. The pitch P of the unit prism 33 is not particularly limited, but the pitch P is 10 µm to 100 µm in usual.

The vertex t of the unit prism 33 may have a sharp shape as illustrated in FIG. 8, or though not illustrated, may be formed into a curved shape in which a vicinity of the vertex t is chamfered, or a tip end thereof may be cut so as to become a flat surface. In a case where the tip end of the vertex t of the unit prism 33 is cut, the height H of the unit prism 33 is defined to be a height from the point that is the root between the unit prisms 33 in the thickness direction to a flat surface of the tip end.

Figure 9:
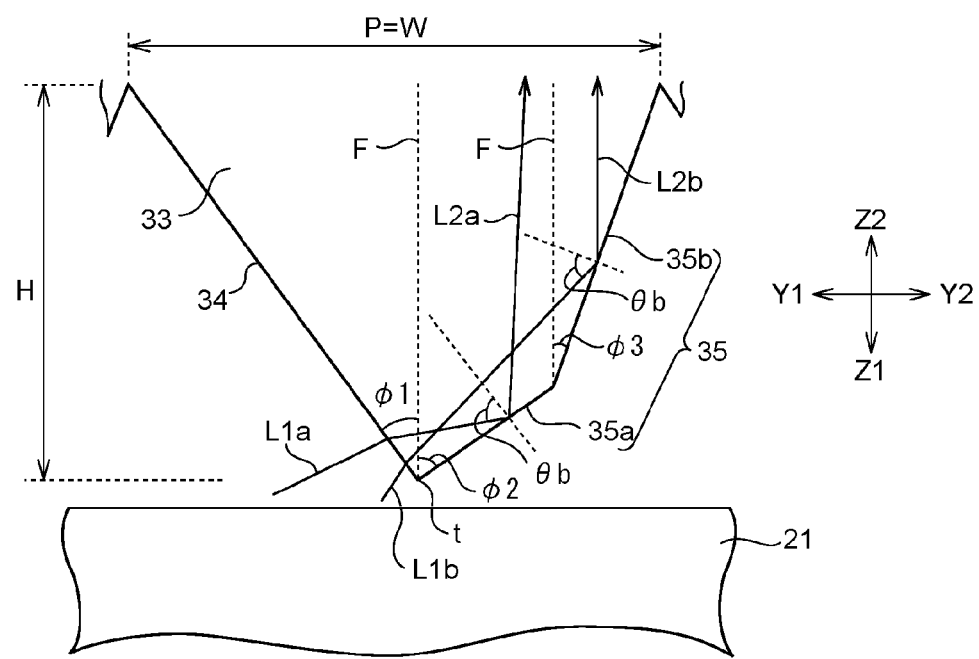
FIG. 9 is a schematic view illustrating a unit prism according to another embodiment.

FIG. 9 is a view illustrating a unit prism 33 according to another embodiment. FIG. 9 illustrates a shape of the unit prism 33 on a similar cross section to that of FIG. 8. As illustrated in FIG. 9, the unit prism 33 may adopt a form in which the second inclined surface 35 has a plurality of flat surfaces 35a and 35b different in inclination angle. The respective flat surfaces 35a and 35b of the second inclined surface 35 have inclination angles, which allow the first directivity light L1 (L1a, L1b) that enters from the first inclined surface 34 to be internally reflected so as to be converted into the second directivity light L2 (L2a, L2b) having the maximum intensity in the approximately normal direction with respect to the light output surface 30a of the prism sheet 30 for each of components that reach the respective flat surfaces. The inclination angles are controllable individually for each of the flat surfaces. As illustrated in FIG. 9, between the respective flat surfaces of the second incline surface 35, an angle (first reflecting surface angle) formed by the flat surface 35a on the vertex t side (Z1 side) and the normal F is φ2, and an angle (second reflecting surface angle) formed by the flat surface 35b on the base portion 31 side (Z2 side) of the second inclined surface 35 and the normal F is φ3.

The first directivity light L1 (L1a, L1b), which is output from the light guide plate 21 and has the maximum intensity in the first direction, travels straight through the air layer (refractive index: approximately 1.0), thereafter enters the first inclined surface 34 of the unit prism 33, travels approximately straight through the unit prism 33, is individually reflected on the flat surfaces 35a and 35b of the second inclined surface 35, and for each of the components that reach the individual flat surfaces 35a and 35b, is output as the second directivity light L2 (L2a, L2b) having the maximum intensity in the direction (second direction) perpendicular to the light output surface 30a (sheet surface) in the array direction of the unit prism 33. Note that, the first directivity light L1 is blocked by the adjacent unit prism 33. Therefore, in the respective flat surfaces of the second inclined surface 35, as the flat surface is closer to the base portion 31 side (Z2 side), only such a component of the first directivity light L1 that the angle formed with the normal of the sheet surface is small reaches the flat surface. In the embodiment of FIG. 9, the first directivity light L1 is illustrated by being classified into L1a and L1b for each of the components that reach the individual flat surfaces of the second inclined surface 35. The first directivity light L1 is light formed by synthesizing the respective light components (L1a, L1b illustrated in FIG. 9), which are output from the light guide plate 21, with each other. Accordingly, in a case where the unit prism 33 as illustrated in FIG. 9 is formed, the directivity of the second directivity light L2 can be further intensified.

Accordingly, also in such a case where the unit prism 33 has the form as illustrated in FIG. 9, it becomes possible to impart the directivity, which is strong in the normal direction of the sheet surface, to the light (output light from the light output surface of the prism sheet 30) formed by synthesizing the respective light components, which are reflected from the respective flat surfaces 35a and 35b, with each other, and the polarization direction of the light is not varied, either. Moreover, even in the form as illustrated in FIG. 9, the first inclined surface 34 and the second inclined surface 35 include the flat surfaces. Thus, it becomes easy to ensure the shape accuracy thereof, and accordingly, the quality control is easy, and the mass productivity can be enhanced.

In the form illustrated in FIG. 9, the inclination angles of the respective flat surfaces of the second inclined surface 35 are adjusted individually for each of the flat surfaces so that the first directivity light L1 can be converted into the second directivity light L2, which has the maximum intensity in the normal direction of the light output surface 30a (sheet surface) of the prism sheet 30, by the internal reflection. It is preferred for the inclination angles of the respective flat surfaces of the second inclined surface 35 that the flat surface closer to the vertex t of the unit prism 33 have a larger angle formed with the normal F with respect to the light output surface 30a (sheet surface) of the prism sheet 30. That is, in the case of the unit prism 33 illustrated in FIG. 9, it is preferred to satisfy $\phi 2 > \phi 3$. In such a manner, the peak of the maximum intensity of the second directivity light L2 is further narrowed, the directivity of the second directivity light L2 can be enhanced, and the brightness in the front direction can be enhanced. Moreover, the angles $\phi 2$ and $\phi 3$, which are formed by the respective flat surfaces of the second inclined surfaces 35 with the normal F, are appropriately adjusted depending on the predetermined direction where the first directivity light L1 has the maximum intensity, and are 30° to 37° in usual.

As illustrated in FIG. 9, in the case where the second inclined surface 35 of the unit prism 33 includes the two flat surfaces 35a and 35b, a position where a boundary point between the respective flat surfaces 35a and 35b, at which the inclination angle of the second inclined surface 35 is changed, is provided is appropriately adjusted depending on the directivity direction of the first directivity light. When the height H of the unit prism 33 is defined to be 100%, this boundary point is provided at a position where a height from a basal surface (surface where a point serving as the root between the unit prisms 33 is located) of the unit prism 33 is 20% to 80%.

Note that, in the case where the second inclined surface 35 includes the plurality of flat surfaces, the number of flat surfaces is not limited to the number of those illustrated, and the unit prism 33 may include three or more flat surfaces.

In usual, because of excellence in the shape accuracy and excellence in the mass productivity, the prism sheet 30 adopts a form, in which a sheet-like member having light transmissivity is used as the base portion 31, and the prism portion 32 is provided on the one-side surface thereof. However, the prism sheet 30 may have a single layer configuration formed of a single layer by the extrusion of a single material or the like. Similar materials can be used as a material for forming the prism portion in the case of manufacturing the prism sheet 30 by providing the prism portion 32 on the one-side surface side of the base portion having the light transmissivity, and as a material for forming the optical sheet in the case of manufacturing the prism sheet 30 with the single layer configuration by performing the extrusion of the single material. In the following, the material for forming the prism portion and the material for forming the prism sheet with the single layer configuration are generically referred to as a prism material. For example, in a case of using the epoxy acrylate-based or a urethane acrylate-based reactive resin (ionizing radiation curable resin or the like), it is possible to mold the prism material by the 2P method, and the prism portion can be molded on the base, or by curing the material alone in a die. Moreover, in the case of forming the prism sheet by the extrusion, as the prism material, there can be used a light-transmissive thermoplastic resin such as a polyester resin such as PC and PET, an acrylic resin such as PMMA and MS, and cyclic polyolefin. Note that, in the case of forming the prism sheet by the extrusion, molecules of the resin are aligned and the birefringence is generated depending on forming conditions thereof, and accordingly, it is preferred that the prism sheet be formed under such conditions that do not allow the molecules to be aligned.

As a manufacturing method of the prism sheet 30, methods heretofore known in public can be appropriately used. For example, the prism sheet 30 may be formed in such a manner that the material for forming the prism portion, such as an ultraviolet curable resin, is put into a shaping mold for the prism portion 32 having a desired unit prism shape, a base serving as the base portion 31 is stacked thereon, ultraviolet rays and the like are radiated while bringing the base into pressure contact with the material for forming the prism columns by using a laminator and the like so that the material for forming the prism portion is thereby cured, and the mold for the prism columns is released or removed (for example, refer to FIG. 2 of JP 2009-37204 A). Moreover, the prism sheet 30 can be manufactured continuously when a liquid material for forming the prism portion is applied and filled onto a rotating roll intaglio having recessed portions with a shape reverse to the prism shape, the member serving as the base portion 31 is supplied thereto and is pressed against the roll intaglio from above the liquid material for forming the prism portion on a printing plate, in such a pressed state, the liquid material for forming the prism portion is cured by irradiation of the ultraviolet rays and the like, and thereafter, the cured liquid material for forming the prism portion is released from the rotating roll intaglio together with the base (for example, refer to JP 05-169015 A). Moreover, it is possible to manufacture the prism sheet 30 also by the extrusion method by using the thermoplastic resin as described above. As a material in the event of performing the extrusion for the prism sheet 30, the material for forming the prism sheet described above can be used.

A description is made of a method of controlling the polarization direction in the prism sheet 30 and an effect thereof. As illustrated in FIGS. 6 (a) and 6 (b), the first directivity light L1, which is output from the light guide plate 21 and has the maximum intensity in the first direction, is output as the second directivity light L2, which has the maximum intensity in the second direction (normal direction (output angle: 0°; angle β: 90°) of the liquid crystal display panel 15), by the total reflection or the like on the second inclined surface 35 of the unit prism 33 of the prism sheet 30. At this time, for example, in a case where the refractive index n1 of the prism portion 32 is 1.50, θc becomes 41°48'37" because the refractive index n2 of air is 1.0, and the incident light is totally reflected when the incident angle θb is equal to or larger than θc (θn≥θc). As shown in FIGS. 7(b) and 7(c), in the total reflection region (θb≥c), the light of the P component and the light of the S component are output while differentiating and changing phases thereof depending on the incident angle θb. This fact affects the polarization direction of the polarized light thus output. As a measure therefor, the incident angle θb is controlled so that the polarization direction of the light that enters the liquid crystal display panel 15 can be controlled, and the enhancement of the utilization efficiency of the light can be achieved. In this embodiment, the inclination angles and refractive indices of the first inclined surface 34 and the second inclined surface 35 of the unit prism 33 are controlled so that the incident angle θb is controlled. In this manner, in the total reflection region as shown in FIGS. 7(b) and 7(c), a retardation between the P component and the S component can be reduced, and the influence on the polarization direction of the polarized light can be minimized. As a result, the second directivity light can be output in the second direction (approximately normal direction) while substantially maintaining the polarization state of the first directivity light. As described above, the ratio of the P component in the first directivity light is high, and accordingly, the polarization state thereof is maintained so that the light absorbed by the second polarization plate 14 can be reduced, and it becomes possible to effectively use the incident light onto the liquid crystal display panel 15.

Figure 10A:
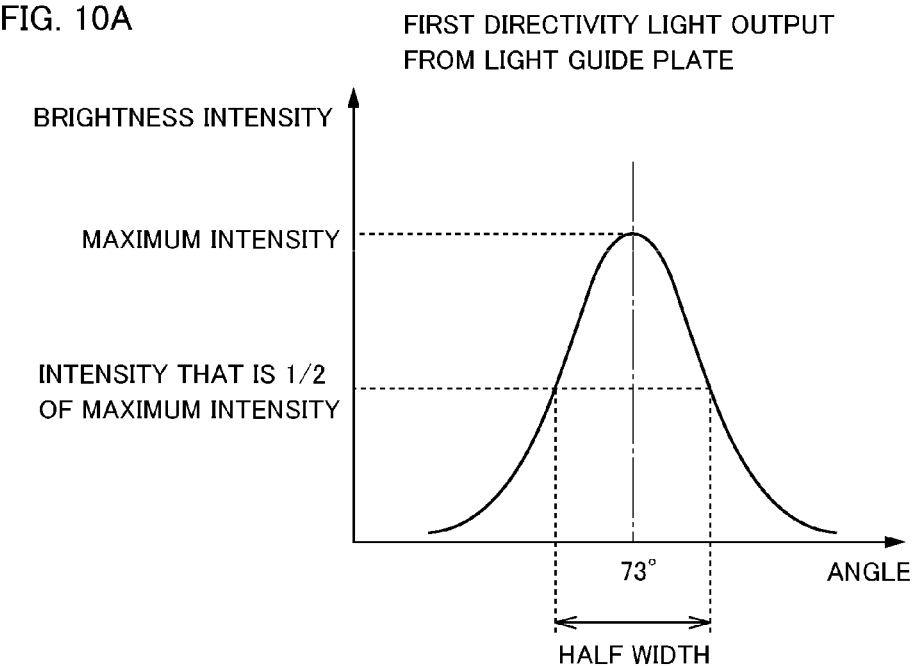
FIGS. 10(a) and 10(b) are graphs showing an intensity distribution of brightness of first directivity light L1 output from the light guide plate and an intensity distribution of brightness of second directivity light L2 output from the prism sheet in one embodiment of the present invention.
Figure 10B:
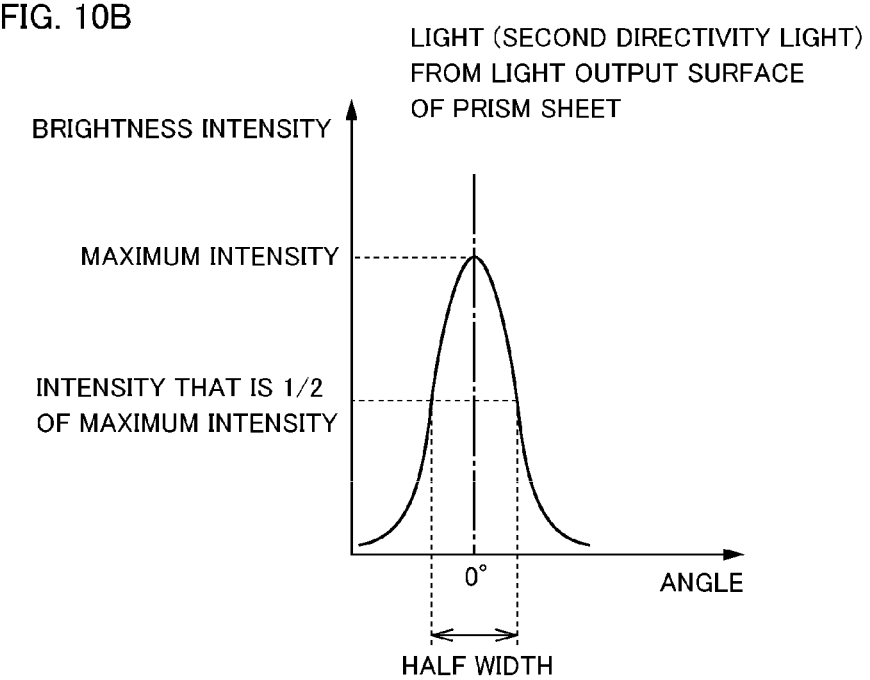

FIGS. 10(a) and 10(b) are graphs showing an intensity distribution of brightness of the first directivity light L1 output from the light guide plate 21 of the embodiment and an intensity distribution of brightness of the second directivity light L2 output from the prism sheet 30 of the embodiment. FIG. 10(a) is a graph showing an example of the intensity distribution of the brightness in the first directivity light L1 output from the light guide plate 21. FIG. 10(b) is a graph showing an example of the intensity distribution of the brightness in the second directivity light L2 output from the light output surface 30a of the prism sheet 30. For example, this graph is obtained by measuring the intensity distribution of the brightness of the light, which is output from the light guide plate 21, at room temperature in the atmosphere, by using a luminance meter provided with a goniometer or a light distribution measuring device such as EZ Contrast manufactured by ELDIM S. A.

As shown in FIG. 10(a), the first directivity light output from the light guide plate 21 of the embodiment has the maximum intensity in a direction of approximately 73° to the side surface 21b side (Y2 side) with respect to the normal of the light output surface of the light guide plate 21 in the up-and-down direction (Y direction) of the screen, and is distributed in a range of 60° to 80°. Note that, it is preferred that most of the first directivity light L1 be directed to angles formed with normal in this range. However, light out of this range may be present. In the first directivity light L1, an angle (half width angle) at which a half width of the intensity distribution thereof is obtained can be set at ±5° or more, and in usual, is ±10° to 20°, and in addition, the first directivity light L1 is polarized light in which a ratio of light (P component) having such a polarization direction that has an oscillation surface in the YZ plane is high. The half width refers to an angular difference from an angle having a maximum value, which is 100% in the peak of the maximum intensity of the brightness, to an angle when the intensity of the brightness becomes 50%. The directivity is weakened as the half width is larger.

As shown in FIG. 10(b), the second directivity light L2, which is the light output from the light output surface 30a of the prism sheet 30, has a maximum intensity in the normal direction of the sheet surface by a deflection function of the unit prism 33, and a half width thereof can be set smaller than the half width of the first directivity light L1. Moreover, by an optical function of the unit prism 33 of the prism sheet 30 of this embodiment, the prism sheet 30 can convert the light, which is output from the light guide plate 21, so that a half width angle of the light output from the light output surface 30a can be ±20° or less, and further can be ±10° or less by adopting a more suitable form. In the light output from the light output surface 30a of the prism sheet 30, as the half width thereof is smaller, the brightness in the front direction is enhanced, and the variations of the polarization direction due to expansion of the directivity are also reduced. As described above, the surface light source device 20 of this embodiment includes the above-mentioned light guide plate 21 and prism sheet 30, and can thereby output light with such high directivity that allows the half width angle to be ±20° or less, that is, approximately parallel light from the light output surface (light output surface 30a of the prism sheet 30) of the surface light source device 20 in the normal direction thereof. In addition, the surface light source device 20 can change the output light to the light in which the ratio of the light (P component) of such a polarization direction that has the oscillation surface in the direction approximately parallel to the transmission axis of the second polarizing plate 14, that is, in the YZ plane is high. As a result, the light absorbed by the second polarizing plate 14 can be reduced, and it becomes possible to effectively use the incident light onto the liquid crystal display panel 15.

Figure 11A:
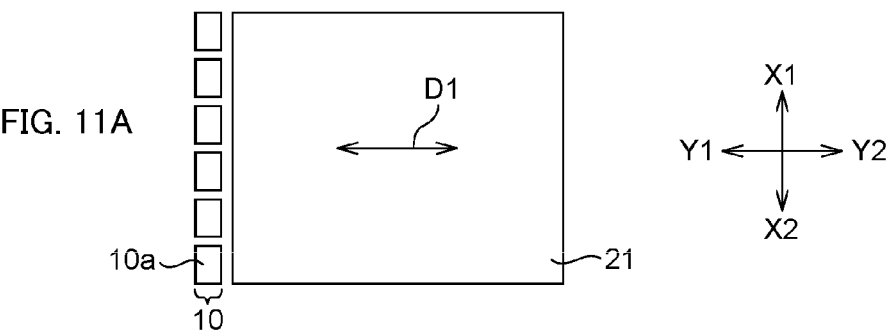
FIGS. 11(a) to 11(d) are views illustrating relationships among polarization directions of the output light from the light guide plate and the prism sheet, and a transmission axis of a first polarizing plate and a transmission axis of a second polarizing plate in one embodiment of the present invention.
Figure 11B:
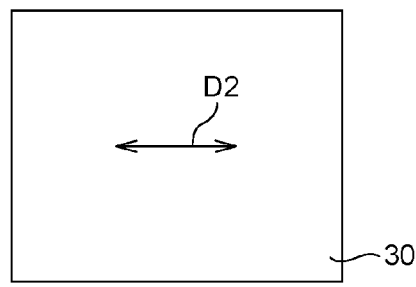

FIGS. 11(a) to 11(d) are views illustrating relationships among the polarization directions of the output light from the light guide plate 21 and prism sheet 30 and the transmission axis of the first polarizing plate 13 and the transmission axis of the second polarizing plate 14 in this embodiment. As described above, in the light (first directivity light) output from the light guide plate 21, the ratio of the P component is high, and a main polarization direction thereof is substantially an arrow D1 direction (Y direction) as illustrated in FIG. 11(a). Moreover, the light output from the light guide plate 21 is output while an intensity peak direction thereof is deflected by the prism sheet 30. At this time, the output light is deflected by the total reflection on the interface of the unit prism 33, and in addition, the base portion 31 of the prism sheet 30 is a member that does not have the birefringence. Accordingly, the polarization direction of the light (second directivity light) output from the prism sheet 30 is substantially an arrow D2 direction (Y direction) as illustrated in FIG. 11(b). That is, the light output from the surface light source device 20 is polarized light mainly having a polarization direction as the arrow D2 direction.

Figure 11C:
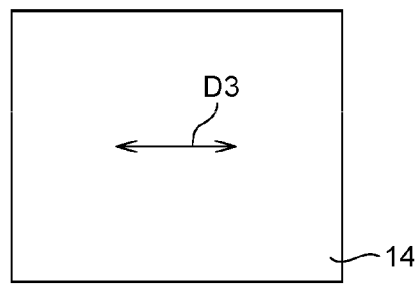
Figure 11D:
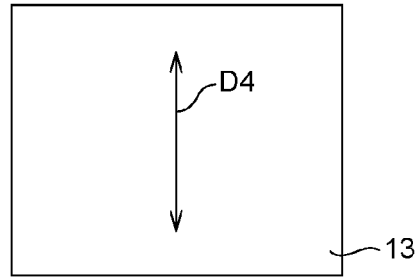

The light output from the surface light source device 20 enters the second polarizing plate 14 of the liquid crystal display panel 15. As illustrated in FIG. 11(c), the transmission axis of this second polarizing plate 14 is substantially an arrow D3 direction (Y direction). The direction D3 of this transmission axis of the second polarizing plate 14 is a direction (Y direction) approximately parallel to the array direction of the back surface-side unit optical elements 26 and the array direction of the unit prisms 33. Moreover, as illustrated in FIG. 11(d), the transmission axis of the first polarizing plate 13 is substantially an arrow D4 direction (X direction). Accordingly, the main polarization direction D2 of the light output from the surface light source device 20 (prism sheet 30) and the transmission axis D3 of the second polarizing plate 14 are parallel to each other. Moreover, the transmission axis D4 of the first polarizing plate 13 is perpendicular to the transmission axis D3 of the second polarizing plate 14, and is approximately parallel to the polarization direction of the light in which the polarization direction is rotated by 90° by the liquid crystal cell 12 to which the electric field is applied. Further, in the light that enters the liquid crystal display panel 15, the half width thereof is narrower in comparison with that of the conventional technique, and the directivity thereof becomes high. Accordingly, the variations and the like of the polarization direction are small. Therefore, an amount of the light (polarized light), which is output from the surface light source device 20 (prism sheet 30) and is absorbed by the second polarizing plate 14, can be reduced to a large extent, and the utilization efficiency of the light is enhanced.

As described above, according to this embodiment, the output direction of the first directivity light L1, in which the ratio of the P component in the polarized light output from the light guide plate 21 is high and which has the maximum intensity in the first direction, is deflected to the second direction (front direction of the screen of the liquid crystal display apparatus 1) by the prism sheet 30 so that the second directivity light L2 is output as light, which maintains the polarization state of the first directivity light L1, and includes a large amount of the polarized light having the polarization direction parallel to the transmission axis of the second polarizing plate 14. Moreover, the transmission axis of the first polarizing plate 13 is perpendicular to the transmission axis of the second polarizing plate 14, and is approximately parallel to the polarization direction of the light in which the polarization direction is rotated by 90° by the liquid crystal cell 12 to which the electric field is applied. Therefore, the transmittance of the liquid crystal display panel 15 can be maximized, the light utilization efficiency of the display apparatus 1 can be enhanced, and a bright image can be displayed.

The description has been made above of the specific embodiment of the present invention. However, it is apparent for those skilled in the art that various modifications can be made without departing from the technical idea of the present invention. The present invention incorporates all of such modifications. A description is made below of some typical examples among the possible modifications. It is needless to say that forms of the possible modifications described below and forms of modifications that are omitted from the description and are apparent for those skilled in the art may be combined with one another as appropriate.

(1) The prism sheet 30 may adopt a form including only the prism portion 32 without including the base portion 31 when sufficient rigidity or the like is inherent therein. Moreover, the prism sheet 30 is not limited to the form of being a separate body from the second polarizing plate 14 and the polarized light selective reflection sheet 16, and may adopt a form of integrating the prism portion 32 with the light guide plate 21 side (Z1 side) of the second polarizing plate 14 or the polarized light selective reflection sheet 16. When such a form is adopted, the influence of the base portion 31 on the polarization direction of the light can be reduced to a large extent, and accordingly, a brighter liquid crystal display apparatus can be obtained. Moreover, the number of components can be reduced, and hence the liquid crystal display apparatus can be manufactured inexpensively, and the form thus adopted can contribute to the thinning of the liquid crystal display apparatus. The thinning of the liquid crystal display apparatus increases choices of design, and accordingly, is commercially valuable. Further, when such a form is adopted, the prism sheet can be avoided from being flawed by being rubbed when attaching the prism sheet onto the surface light source device (substantially, the light guide plate), and accordingly, turbidity of display, which is caused by such flaws, can be prevented. For example, a prism sheet-added polarizing plate in which the prism sheet is integrated with the polarizing plate can be used as the second polarizing plate. A description is made below of typical examples of specific characteristics, material and the like of polarizers usable suitably for the prism sheet-added polarizing plate.

The transmittance of the above-mentioned polarizer (single axis transmittance) at the wavelength of 589 nm is preferably 41% or more, more preferably 42% or more. Note that, the theoretical upper limit of the single axis transmittance is 50%. In addition, polarization degree thereof is preferably from 99.5% to 100%, more preferably from 99.9% to 100%. As long as the polarization degree falls within the range, contrast in the front direction can be further higher when using the liquid crystal display apparatus.

The single axis transmittance and polarization degree described above can be measured with a spectrophotometer. A specific measurement method for the polarization degree described above may involve measuring parallel transmittance ($H_0$) and perpendicular transmittance ($H_{90}$) of the polarizer, and determining the polarization degree through the following expression: polarization degree (%)=$\{(H_0-H_{90})/(H_0+H_{90})\}^{1/2} \times 100$. The parallel transmittance ($H_0$) described above refers to a value of transmittance of a parallel-type laminated polarizer manufactured by causing two identical polarizers to overlap with each other in such a manner that absorption axes thereof are parallel to each other. In addition, the perpendicular transmittance ($H_{90}$) described above refers to a value of a transmittance of a perpendicular-type laminated polarizer manufactured by causing two identical polarizers to overlap with each other in such a manner that absorption axes thereof are perpendicular to each other. Note that, each transmittance is a Y value obtained through relative spectral responsivity correction at a two-degree field of view (C light source) in JIS Z 8701-1982.

Any appropriate polarizer may be adopted as the polarizer depending on purpose. Examples thereof include a polarizer obtained by causing a hydrophilic polymer film such as a polyvinyl alcohol-based film, a partially formalized polyvinyl alcohol-based film, or an ethylene-vinyl acetate copolymer-based partially saponified film to absorb a dichroic substance such as iodine or a dichroic dyestuff, followed by uniaxial stretching, and a polyene-based alignment film such as a product obtained by subjecting polyvinyl alcohol to dehydration treatment or a product obtained by subjecting polyvinyl chloride to dehydrochlorination treatment. In addition, there may also be used, for example, guest-host-type E-type and O-type polarizers each including a dichroic substance and a crystalline compound in which the crystalline composition is aligned in a fixed direction as disclosed in, for example, U.S. Pat. No. 5,523,863, and E-type and O-type polarizers in which the lyotropic liquid crystals are aligned in a fixed direction as disclosed in, for example, U.S. Pat. No. 6,049,428.

Of such polarizers, a polarizer formed of a polyvinyl alcohol-based film containing iodine is suitably used from the viewpoint of having a high polarization degree. The polyvinyl alcohol or a derivative thereof is used as a material for the polyvinyl alcohol-based film to be applied onto the polarizer. Examples of the derivative of polyvinyl alcohol include polyvinyl formal and polyvinyl acetal as well as polyvinyl alcohol modified with, for example, an olefin such as ethylene or propylene, an unsaturated carboxylic acid such as acrylic acid, methacrylic acid, or crotonic acid, alkyl ester thereof, or acrylamide. Polyvinyl alcohol having a polymerization degree of about from 1,000 to 10,000 and a saponification degree of about from 80 mol % to 100 mol % are generally used.

The polyvinyl alcohol-based film (unstretched film) is subjected to at least uniaxial stretching treatment and iodine dyeing treatment according to usual methods, and may further be subjected to boric acid treatment or iodine ion treatment. In addition, the polyvinyl alcohol-based film (stretched film) subjected to the treatment described above becomes a polarizer through drying according to a usual method.

The stretching method in the uniaxial stretching treatment is not particularly limited, and any one of a wet stretching method and a dry stretching method may be adopted. As a stretching means for the dry stretching method, there is given, for example, a roll stretching method, a heating roll stretching method, or a compression stretching method. The stretching may be performed in a plurality of steps. In the stretching means, the unstretched film is generally in a heated state. A film having a thickness of about from 30 µm to 150 µm is generally used as the unstretched film. The stretching ratio of the stretched film may be appropriately set depending on purpose. However, the stretching ratio (total stretching ratio) is about from 2 times to 8 times, preferably from 3 times to 6.5 times, more preferably from 3.5 times to 6 times. The thickness of the stretched film is suitably about from 5 µm to 40 µm.

The iodine dyeing treatment is performed by immersing the polyvinyl alcohol-based film in an iodine solution containing iodine and potassium iodide. The iodine solution is generally an iodine aqueous solution, and contains potassium iodide as iodine and a dissolution aid. The concentration of iodine is preferably about from 0.01 wt % to 1 wt %, more preferably from 0.02 wt % to 0.5 wt %, and the concentration of potassium iodide is preferably about from 0.01 wt % to 10 wt %, more preferably from 0.02 wt % to 8 wt %.

In iodine dyeing treatment, the temperature of the iodine solution is generally about from 20° C. to 50° C., and is preferably from 25° C. to 40° C. Time period of the immersion falls within a range of generally about from 10 seconds to 300 seconds, and is preferably from 20 seconds to 240 seconds. In iodine dyeing treatment, through adjustment of conditions such as the concentration of the iodine solution, and the immersion temperature and time period of the immersion of polyvinyl alcohol-based film into the iodine solution, iodine content and potassium content in the polyvinyl alcohol-based film is adjusted so as to allow both to fall within a desired range. The iodine dyeing treatment may be performed at any one of the time points before the uniaxial stretching treatment, during the uniaxial stretching treatment, and after the uniaxial stretching treatment.

The boric acid treatment is performed by immersing the polyvinyl alcohol-based film in a boric acid aqueous solution. The concentration of boric acid in the boric acid aqueous solution is about from 2 wt % to 15 wt %, preferably from 3 wt % to 10 wt %. With potassium iodide, potassium ion and iodine ion may be incorporated in the boric acid aqueous solution. The concentration of potassium iodide in the boric acid aqueous solution is about from 0.5 wt % to 10 wt %, and is preferably from 1 wt % to 8 wt %. A polarizer with low coloration, that is, almost constant absorbance over approximately entire wavelength region of visible light, so-called neutral grey can be obtained with a boric acid aqueous solution containing potassium iodide.

For example, an aqueous solution obtained by incorporating iodine ion with, for example, potassium iodide is used for the iodine ion treatment. The concentration of potassium iodide is preferably about from 0.5 wt % to 10 wt %, more preferably from 1 wt % to 8 wt %. In iodine ion immersion treatment, the temperature of the aqueous solution is generally about from 15° C. to 60° C., and is preferably from 25° C. to 40° C. Time period of the immersion is generally about from 1 second to 120 seconds, and preferably falls within a range of from 3 seconds to 90 seconds. The time point of the iodine ion treatment is not particularly limited as long as the time point is before the drying step. The treatment may be performed after water washing described later.

The polyvinyl alcohol-based film (stretched film) subjected to the treatment described above may be subjected to a water washing step and a drying step according to a usual method.

Any appropriate drying method such as natural drying, drying by blowing, or drying by heating may be adopted as the drying step. In the case of the drying by heating, for example, drying temperature thereof is typically from 20° C. to 80° C., and is preferably from 25° C. to 70° C. Time period of the drying is preferably about from 1 minute to 10 minutes. In addition, the moisture content of the polarizer after the drying is preferably from 10 wt % to 30 wt %, more preferably from 12 wt % to 28 wt %, still more preferably from 16 wt % to 25 wt %. When the moisture content is excessively high, in drying the polarizing plate, the polarization degree is liable to decrease in accordance with the drying of the polarizer. In particular, the perpendicular transmittance in a short wavelength region of 500 nm or less is increased, that is, the black display is liable to be colored with blue because of the leakage of the short wavelength light. On the contrary, when the moisture content of the polarizer is excessively small, a problem such as local unevenness defect (knick defect) may easily occur.

Figure 12:
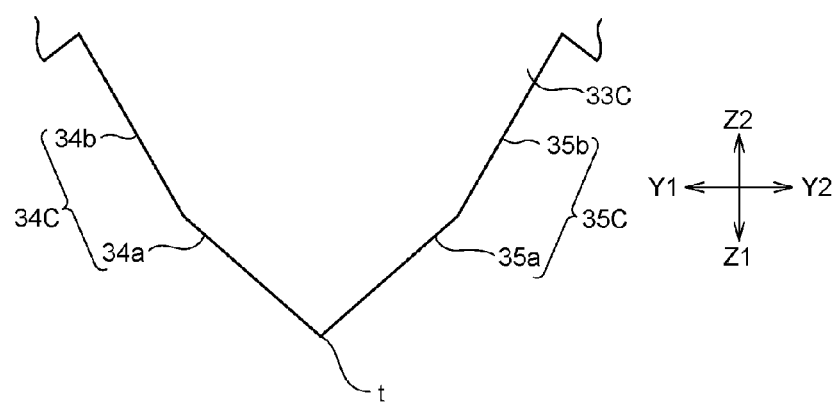
FIG. 12 is a schematic view illustrating a shape of a modified form of the unit prism.

(2) Each of the unit prisms 33 of the prism sheet 30 is not limited to the form in which, on the cross section parallel to the array direction and parallel to the thickness direction, the cross-sectional shape thereof is asymmetrical with respect to the straight line passing through the vertex and perpendicular to the sheet surface, and may adopt a form in which the above-mentioned cross-sectional shape is symmetrical like an isosceles triangular shape. Ina case of adopting a unit prism in which a cross-sectional shape is an isosceles triangular shape, it is preferred that the brightness distribution of the light output from the light guide plate 21 be set as a narrower distribution than in the prism sheet 30 described in the embodiment from a viewpoint of enhancing the light condensing property. Moreover, as illustrated in FIG. 12, the unit prism 33 may adopt a polygonal shape in which a cross-sectional shape is symmetrical with respect to the straight line passing through the vertex and perpendicular to the sheet surface. A prism sheet including the unit prism 33 with such a shape in which the cross-sectional shape is symmetrical can also be applied to the dual lamp-type surface light source device.

A description is briefly made of the modification of the unit prism 33, which is illustrated in FIG. 12. In a unit prism 33C, both of a first inclined surface 34C and a second inclined surface 35C each have a plurality of flat surfaces, and a cross-sectional shape of the unit prim 33C is a symmetrical shape with respect to a line passing through a vertex t thereof and perpendicular to the sheet surface. The unit prism 33C has an approximately triangular column shape (polygonal shape) having the first inclined surface 34C including two flat surfaces 34a and 34b different in inclination angle, and the second inclined surface 35C including two flat surfaces 35a and 35b different in inclination angle. At this time, the unit prism 33C is arranged so that the first inclined surface 34C can be located on the side surface 21a side, and that the second inclined surface 35C can be located on the side surface 21b side. Light entering from the side surfaces 21a and 21b is guided in the light guide plate 21, and is output as the first directivity light from the light guide plate 21 toward the unit prism 33C illustrated in FIG. 12. This first directivity light enters from the flat surfaces 34a and 34b of the first inclined surface 34C and the flat surfaces 35a and 35b of the second inclined surface 35C. In the unit prism 33C, as described above, the inclination angles of the respective flat surfaces 34a and 34b of the first inclined surface 34C are angles at which the first directivity light from the light guide plate 21 is capable of entering, and are also angles at which the light entering from the second inclined surface 35C can be reflected as the second directivity light having the maximum intensity in the normal direction of the sheet surface. Moreover, the inclination angles of the respective flat surfaces 35a and 35b of the second inclined surface 35C are angles at which the light entering from the first inclined surface 34C can be reflected as the second directivity light having the maximum intensity in the normal direction of the sheet surface, and are angles at which the first directivity light from the light guide plate 21 is capable of entering. Preferred conditions of the inclination angles of the respective flat surfaces 34a and 34b of the first inclined surface 34C are similar to the above-mentioned preferred conditions on the respective flat surfaces of the second inclined surface 35 illustrated and shown in FIGS. 6(a) and 6(b) and FIG. 7(a). Such a form is adopted for the unit prism 33 so that, also in the liquid crystal display apparatus including the dual lamp-type surface light source device, the utilization efficiency of the light can be enhanced, and a bright image can be displayed. Note that, without being limited to the shape as described above, the unit prism 33 may be a trapezoid in which a vertex portion of a triangle is changed to a short upper side, or may have a curved shape in which at least one of the inclined surfaces protrudes to the light guide plate 21 side.

(3) The light guide plate 21 is not limited to the form in which the thickness of the base portion 22 is approximately constant. In the case of providing the light source unit 10 on one side surface side, the light guide plate 21 may have a tapered shape, which is thickest on the side surface 21a side on which the light source unit 10 is provided, and becomes gradually thinner as being closer to the opposed side surface 21b side. By adopting such a form, the utilization efficiency of the light and the evenness in brightness can be enhanced. Moreover, in the case of the dual lamp-type surface light source device in which the light source unit 10 is arranged on both the side surfaces 21a and 21b of the light guide plate 21, the light guide plate 21 may be a light guide plate in which the back surface side is formed into an arch shape having a thin center portion. Further, the light guide plate 21 may have a form including the back surface-side unit optical elements 26 and the light output-side unit optical elements 24, which are described in JP 2007-220347 A, JP 2011-90832 A, JP 2004-213019 A, JP 2008-262906 A, and the like.

(4) The prism sheet 30 may adopt a form including a light diffusion layer in order to impart a light diffusion function as needed to an extent of not disturbing the polarization. For example, as the light diffusion layer, a layer having light-diffusing microparticles dispersed in a light-transmissive resin, and the like can be used. This light diffusion layer can be provided at any position of the prism sheet 30. For example, the light diffusion layer may be provided on the light output surface 30a, or may be provided between the base portion 31 and the prism portion 32 in the thickness direction.

(5) The light output surface 30a of the prism sheet 30 is not limited to the form of the flat and smooth surface, and for example, on the front surface of the light output surface 30a, there may be formed a mat layer having a group of micro protrusions in which an average protrusion height (for example, ten point average roughness Rz prescribed in JIS B 0601 (1994 version)) is preferably the visible light wavelength range (typically 0.38 μm to 0.78 μm) or more. By forming the mat layer, interference with another member due to intimate contact therewith can be prevented, and/or an appearance defect such as a flaw can be hidden. It is preferred that the mat layer have a micro uneven shape to an extent of not disturbing the polarization direction of the first directivity light. The mat layer can be formed by appropriately using mat agent coating, embossing, or the like. In a case of coating a mat agent, a stretch balance between the prism portion 32 and the mat layer formed by the coating can be adjusted, and an effect is obtained that deformation of the prism sheet 30, such as warp and deflection, is suppressed.

(6) Depending on the purpose, the surface light source device 20 may further include any appropriate optical sheet at any appropriate position. For example, the surface light source device 20 may include a light diffusion sheet, a lens array sheet, or the like between the light guide plate 21 and the prism sheet 30 and/or between the prism sheet 30 and the liquid crystal display panel 15. In a case where the surface light source device includes the light diffusion sheet, a viewing angle of the liquid crystal display apparatus can be widened.

(7) Depending on the purpose, the liquid crystal display apparatus may further include any appropriate optical compensation film (in this specification, also referred to as an anisotropic optical element, a retardation film, and a compensation plate in some cases) at any appropriate position. An arrangement position of the optical compensation film, the number of films for use, birefringence (index ellipsoid) thereof, and the like can be selected appropriately depending on a drive mode of the crystal cell, desired characteristics, and the like.

For example, when the liquid crystal cell employs the IPS mode, the liquid crystal display apparatus may include a first anisotropic optical element that satisfies a relationship of $nx_1 > ny_1 > nz_1$ and is arranged between the liquid crystal cell 12 and the second polarizing plate 14, and a second anisotropic optical element that satisfies a relationship of $nz_2 > nx_2 > ny_2$ and is arranged between the first anisotropic optical element and the liquid crystal cell. The second anisotropic optical element may be a so-called positive C plate that satisfies a relationship of $nz_2 > nx_2 = ny_2$. The slow axis of the first anisotropic optical element and the slow axis of the second anisotropic optical element may be perpendicular or parallel, and it is preferred that the slow axes be parallel in consideration of the viewing angle and productivity. Further, a preferred range of each retardation in this case is as follows.

60 nm < $Re_1$ < 140 nm
1.1 < $Nz_1$ < 1.7
10 nm < $Re_2$ < 70 nm
−120 nm < $Rth_2$ < −40 nm

In the expressions, Re represents the in-plane retardation of the anisotropic optical element as defined above. Rth represents the thickness direction retardation of the anisotropic optical element, and is represented by $Rth = \{(nx_1 + n_{y2})/2 - nz_2\} \times d_2$. Nz represents an Nz coefficient, and is represented by $Nz = (nx_1 - nz_1)/(nx_1 - ny_1)$. In the expressions, nx and ny are as defined above. nz represents a thickness direction refractive index of the optical member (in this case, the first anisotropic optical element or the second anisotropic optical element). Note that, subscripts "1" and "2" represent the first anisotropic optical element and the second anisotropic optical element, respectively.

Alternatively, the first anisotropic optical element may satisfy a relationship of $nx_1 > nz_1 > ny_1$, and the second anisotropic optical element may be a so-called negative C plate, which satisfies a relationship of $nx_2 = ny_2 > nz_2$. Note that, herein, for example, "nx=ny" encompasses not only a case where nx and ny are strictly equal to each other but also a case where nx and ny are substantially equal to each other. The description: "substantially equal" used herein means to encompass a case where nx and ny differ from each other in such a range that overall optical characteristics of the liquid crystal display apparatus are not practically affected. Therefore, the negative C plate in this embodiment encompasses the case where the plate has biaxiality.

The second anisotropic optical element may be omitted depending on the purpose or desired characteristics.

When the liquid crystal cell employs the IPS mode, the liquid crystal display panel may be in a so-called O mode or a so-called E mode. The description: "liquid crystal display panel in the O mode" refers to a panel in which the absorption axis direction of the polarizer arranged on the light source side of the liquid crystal cell is substantially parallel to the initial alignment direction of the liquid crystal cell. The description: "liquid crystal panel in the E mode" refers to a panel in which the absorption axis direction of the polarizer arranged on the light source side of the liquid crystal cell is substantially perpendicular to the initial alignment direction of the liquid crystal cell. The description: "initial alignment direction of the liquid crystal cell" refers to a direction in which in absence of the electric field, the in-plane refractive index of the liquid crystal layer obtained as a result of alignment of liquid crystal molecules contained in the liquid crystal layer becomes maximum. In the case of the O mode, the above-mentioned anisotropic optical element may be arranged between the first polarizing plate and the liquid crystal cell, and in the case of the E mode, the above-mentioned anisotropic optical element may be arranged between the second polarizing plate and the liquid crystal cell.

In addition, for example, when the liquid crystal cell employs the VA mode, in the liquid crystal display apparatus, a circularly polarizing plate may be used as the polarizing plate. That is, the first polarizing plate may include an anisotropic optical element that functions as a $\lambda/4$ plate on the liquid crystal cell side of the polarizer, and the second polarizing plate may include an anisotropic optical element that functions as a $\lambda/4$ plate on the liquid crystal cell side of the polarizer. The second polarizing plate may include another anisotropic optical element with a relationship of refractive indices of nz>nx>ny between the above-mentioned anisotropic optical element and the polarizer. Further, when acell represents a retardation wavelength dispersion value (Recell[450]/Recell[550]) of the liquid crystal cell, and $\alpha(\lambda/4)$ represents an average retardation wavelength dispersion value (Re($\lambda/4$)[450]/Re($\lambda/4$)[550]) of the anisotropic optical elements of the above-mentioned first polarizing plate and the above-mentioned second polarizing plate, $\alpha(\lambda/4)$/a cell is preferably 0.95 to 1.02. Further, an angle formed between the absorption axis of the polarizer of the first polarizing plate and the slow axis of the above-mentioned anisotropic optical element is preferably substantially 45° or substantially 135°. In addition, it is preferred that the Nz coefficient of the above-mentioned anisotropic optical element satisfy a relationship of $1.1<Nz\leq2.4$, and that the Nz coefficient of the above-mentioned another anisotropic optical element satisfy a relationship of $-2\leq Nz\leq-0.1$.

When the liquid crystal cell employs the VA mode, in the liquid crystal display apparatus, a linearly polarizing plate may also be used as the polarizing plate. That is, the first polarizing plate may include an anisotropic optical element other than the $\lambda/4$ plate on the liquid crystal cell side of the polarizer, and the second polarizing plate may include an anisotropic optical element other than the $\lambda/4$ plate on the liquid crystal cell side of the polarizer. Each of the anisotropic optical elements of the above-mentioned first polarizing plate and the above-mentioned second polarizing plate may be one element or two or more elements. Such an anisotropic optical element in the linearly polarizing plate compensates, through birefringence, light leakage caused by birefringence of the liquid crystal cell, shift of an apparent angle of the absorption axis of the polarizer in the case of viewing from an oblique direction, or the like. Depending on the purpose or the like, any appropriate optical characteristics may be used as the optical characteristics thereof. For example, it may be preferred that the above-mentioned anisotropic optical element satisfy a relationship of nx>ny>nz. More specifically, the in-plane retardation Re of the anisotropic optical element is preferably from 20 nm to 200 nm, more preferably from 30 nm to 150 nm, still more preferably from 40 nm to 100 nm. The thickness direction retardation Rth of the anisotropic optical element is preferably from 100 nm to 800 nm, more preferably from 100 nm to 500 nm, still more preferably from 150 nm to 300 nm. The Nz coefficient of the anisotropic optical element is preferably from 1.3 to 8.0.

(8) The light guide plate 21 may contain a light scattering material. For example, the base portion 22 of the light guide plate 21 may contain an approximately uniformly dispersed light scattering material (light-diffusing particle: not shown). The light scattering material has a function of changing a traveling direction of light traveling in the base portion 22 through, for example, reflection or refraction to diffuse (scatter) the light. As the light scattering material, there may be used a particle formed of a material having a refractive index different from that of the base of the base portion 22 or a particle formed of a material having a reflection action for light. The material property, the average particle diameter, the refractive index, and the like of the light scattering material may appropriately be adjusted depending on intensity of directivity required for outputting light from the light guide plate 21. In the material property, the average particle diameter, the refractive index, and the like of the light scattering material, for example, the ranges disclosed in JP 3874222 B2 may be adopted. The entire disclosure of JP 3874222 B2 is incorporated by reference herein. As a material for forming the light scattering material, there is given, for example, a particle made of a transparent substance such as silica (silicon dioxide), alumina (aluminum oxide), an acrylic resin, a PC resin, and a silicone-based resin. In this form, it is preferred to provide the back surface-side unit optical element 26 as illustrated in FIG. 1, FIGS. 4(a) and 4(b), and FIGS. 5(a) and 5(b).

(9) Note that, in a general liquid crystal display apparatus, the first polarizing plate is generally arranged in such a manner that its polarized light component in the vertical direction is transmitted and its polarized light component in the horizontal direction is absorbed in consideration of a case where the liquid crystal display apparatus is viewed while wearing polarizing sunglasses. However, in the present invention, when the first polarizing plate and the second polarizing plate are arranged so as to utilize the polarized light component of the light source device, the transmission axis of the first polarizing plate is approximately perpendicular to the transmission axis of the polarizing sunglasses in some cases. Therefore, in the present invention, there may be used an optical member for partially or entirely changing or eliminating the polarization state or the polarization axis angle on the viewer side of the first polarizing plate (such as a $\lambda/4$ plate, a $\lambda/2$ plate, a high retardation film, or a scattering element).

(10) As described above, one of the features of the present invention is that the second directivity light contains a large amount of P components of polarized light so as to match with the transmission axis of the second polarizing plate, thereby improving the light utilization efficiency. That is, the present invention realizes improvement of the light utilization efficiency by arranging the liquid crystal display panel in such a manner that the YZ plane of the light guide plate is parallel to the transmission axis of the second polarizing plate and thus the absorption axis of the second polarizing plate is perpendicular to the YZ plane. However, as described above, depending on the azimuth angle of the first polarizing plate, a problem may arise as in the case of using the polarizing sunglasses. Therefore, a λ/2 plate may be used in order to freely set the angle of the absorption axis of the polarizing plate used for the liquid crystal display panel. Specifically, the λ/2 plate is arranged between the second polarizing plate and the prism portion, and thus, the polarization direction can optimally be changed for use. In this case, the λ/2 plate may be arranged between the polarized light selective reflection sheet and the prism portion, or may be arranged between the polarized light selective reflection sheet and the second polarizing plate. When the λ/2 plate is arranged between the polarized light selective reflection sheet and the prism portion, the λ/2 plate may be arranged in such a manner that the slow axis of the λ/2 plate is in the direction between the direction of the transmission axis of the polarized light selective reflection sheet and the direction of the YZ plane of the light guide plate. In this case, it may be preferred that the λ/2 plate be arranged in such a manner that its slow axis is in an average angle of the angle (direction) of the transmission axis of the polarized light selective reflection sheet and the angle (direction) of the YZ plane of the light guide plate. When the λ/2 plate is arranged between the polarized light selective reflection sheet and the second polarizing plate, the transmission axis of the polarized light selective reflection sheet may be arranged in parallel to the YZ plane, and the slow axis of the λ/2 plate may be arranged in the direction between the direction of the transmission axis of the second polarizing plate and the direction of the transmission axis of the polarized light selective reflection sheet. In this case, it may be preferred that the λ/2 plate be arranged in such a manner that its slow axis is in the average axis of the angle (direction) of the transmission axis of the second polarizing plate and the angle (direction) of the transmission axis of the polarized light selective reflection sheet.

EXAMPLES

The present invention is specifically described below by way of examples, but the present invention is not limited to these examples. Testing and evaluating methods in the examples are as follows. Moreover, unless particularly specified, "parts" and "%" in the examples are weight-based units.

(1) Brightness of Liquid Crystal Display Apparatus

Brightness of each of liquid crystal display apparatuses obtained in the examples and comparative examples was evaluated in accordance with JIS C 8152 "Photometry of white light emitting diode for general lighting". Specifically, a total luminous flux of light beams output from the liquid crystal display apparatus was measured by an integrating sphere (trade name: CSTM-LMS-760 Type) manufactured by Labsphere, Inc. in the U.S.A., and an accumulated luminous flux sum was obtained. By taking Comparative Example 1 as a reference (100%), an accumulated luminous flux ratio was taken as an evaluation criterion of the brightness.

(2) Direction of Maximum Intensity of First Directivity Light L1

In each of the surface light source devices obtained in the examples and the comparative examples, a direction of the maximum intensity of the first directivity light L1 output from the light guide plate illustrated in FIGS. 6(a) and 6(b) was measured by a luminance meter (trade name: BM-7) manufactured by Topcon Corporation and by a goniometer, and was obtained as the angle θ from the normal when the normal was defined as 0°. In the measurement, the center portion of the light guide plate was set at a two-degree field of view of the luminance meter, and the surface light source device was inclined in the Y2-axis direction from the Z2-axis, which were illustrated in FIG. 1, by using the goniometer. In this manner, the measurement was performed.

(3) Ratio of Polarized Light Component Oscillating in Plane Approximately Parallel to Light Guiding Direction of Light In each of the surface light source devices obtained in the examples and the comparative examples, a ratio of the polarized light component of the second directivity light L2 output from the prism sheet illustrated in FIGS. 6(a) and 6(b) was measured by the luminance meter (trade name: BM-7) manufactured by Topcon Corporation and by the goniometer, and was obtained by the following expression when the arrow D1 was set at 0° by matching the transmission axis of the polarizing plate with the arrow D1 direction of FIGS. 11(a) to 11(d).

Polarization ratio=0° brightness value/(0° brightness value+90° brightness value)×100%

In the measurement, the center portion of the light guide plate was set at a two-degree field of view of the luminance meter, and the surface light source device was rotated by 0° and 90° in the X-Y plane direction of FIGS. 11(a) to 11(d) by the goniometer. In this manner, the measurement was performed.

(4) Output Characteristics from Surface Light Source

Output characteristics of each of the light guide plates were indicated by the half width angle of the light output in a parallel direction to the arrangement of the light sources of the surface light source. As a measurement method, for each of the surface light source devices obtained in the examples and the comparative examples, a distribution of output from the center portion of the surface light source was measured by using the above-mentioned EZ contrast, and the output characteristics were indicated as an angular width in the parallel direction to the arrangement of the light sources of the surface light source. The angular width shows brightness with a ½ value of that of the peak brightness.

Example 1

(A) Manufacture of Light Guide Plate

Figure 13:
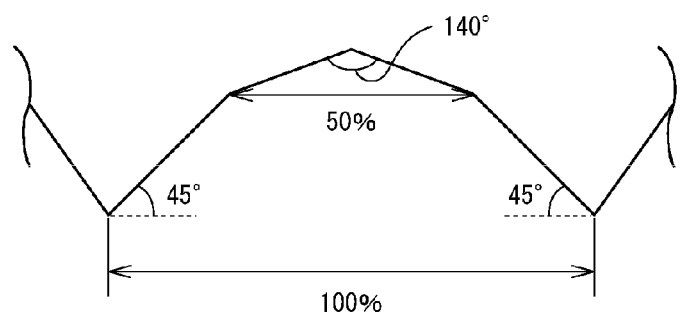
FIG. 13 is a schematic view illustrating a shape of a light output-side unit optical element of a light guide plate used in examples of the present invention.

By using an acrylic resin containing a light scattering material, light output-side unit optical elements and back surface-side unit optical elements were shaped on a sheet serving as the base portion so that a light guide plate as illustrated in FIG. 1 and FIGS. 4(a) and 4(b) was manufactured. Here, unlike FIG. 4(a), the back surface-side unit optical elements had a shape adapted to the single lamp-type surface light source device (wedge-like prism columnar shape in which a cross-sectional shape was an asymmetrical shape on the cross section parallel to the array direction and parallel to the thickness direction). A ridge line direction of the back surface-side unit optical elements was set parallel to the array direction (X direction) of the point light sources of the light source unit. As illustrated in FIG. 13, each of the light output-side unit optical elements had a shape similar to an isosceles triangular column shape (prism shape with a pentagonal cross section in which base angles were θ1=θ2=45° and a portion of 50% in a prism tip end portion when a pitch was defined to be 100% was formed into a prism with a vertex angle of 140°), and a ridge line direction thereof was set as a direction (Y direction) perpendicular to the ridge line direction of the back surface-side unit optical elements. This light guide plate output the first directivity light L1 having the maximum intensity in a direction of approximately 73° to the side surface side (opposite to the light source unit side) with respect to the normal direction of the light output surface in the YZ plane. This light guide plate is hereinafter referred to as a "double-sided prismA" in some cases for convenience.

(B) Reflection Sheet

As the reflection sheet, a silver reflection sheet was used, in which silver was deposited on a surface of a base (PET sheet).

(C) Manufacture of Prism Sheet

As the base portion, a triacetyl cellulose (TAC) film (product name: "Fujitac ZRF80S" manufactured by Fujifilm Corporation; thickness: 80 μm) was used. A predetermined die on which the TAC film was arranged was filled with an ultraviolet-curable urethane acrylate resin as a prism material, and ultraviolet rays were radiated thereonto, to thereby cure the prism material. In this manner, a prism sheet as illustrated in FIG. 8 was manufactured. The in-plane retardation Re of the base portion was 0 nm, and the thickness direction retardation Rth was 5 nm. Each of unit prisms was a triangular column prism, in which a cross-sectional shape parallel to the array direction and parallel to the thickness direction was a scalene triangular shape, and a first inclined surface on the light source unit side was a steeper inclined surface ($\phi 1 < \phi 2$) than a second inclined surface on the other side (refer to FIG. 8). A ridge line direction of the unit prism was set parallel to the array direction (X direction) of the point light sources of the light source unit.

(D) Point Light Source

As the point light source, an LED light source was used, and a plurality of LED light sources were arrayed, to thereby form the light source unit.

(E) Manufacture of Surface Light Source Device

The above-mentioned light guide plate, reflection sheet, prism sheet, and point light source were assembled to one another in the arrangement as illustrated in FIG. 1 so that a surface light source device was manufactured. Note that, all of such surface light source devices used in this example and in Examples 2 to 8 and Comparative Examples 1 to 3, which are described below, are the single lamp-type surface light source devices unlike the surface light source device illustrated in FIG. 1 and FIGS. 4(a) and 4(b).

(F) Manufacture of Polarizing Plate with Compensation Plate for IPS (F-1) Manufacture of First Anisotropic Optical Element A commercially available polymer film (trade name: "ZeonorFilm ZF14-130 (thickness: 60 μm, glass transition temperature: 136° C.)"manufactured by Optes Inc.) whose main component was a cyclic polyolefin-based polymer was subjected to fixed-end uniaxial stretching in its width direction with a tenter stretching machine at a temperature of 158° C. in such a manner that its film width was 3.0 times as large as the original film width (lateral stretching step). The resultant film was a negative biaxial plate having a fast axis in the conveying direction. The negative biaxial plate had a front retardation of 118 nm and an Nz coefficient of 1.16.

(F-2) Manufacture of Second Anisotropic Optical Element

A pellet-shaped resin of a styrene-maleic anhydride copolymer (product name: "DYLARK D232" manufactured by Nova Chemicals Japan Ltd.) was extruded with a single screw extruder and a T die at 270° C., and the resultant sheet-shaped molten resin was cooled with a cooling drum to obtain a film having a thickness of 100 μm. The film was subjected to free-end uniaxial stretching in the conveying direction with a roll stretching machine at a temperature of 130° C. and a stretching ratio of 1.5 times to obtain a retardation film having a fast axis in the conveying direction (longitudinal stretching step). The resultant film was subjected to fixed-end uniaxial stretching in its width direction with a tenter stretching machine at a temperature of 135° C. in such a manner that its film width was 1.2 times as large as the film width after the longitudinal stretching, thereby obtaining a biaxially stretched film having a thickness of 50 μm (lateral stretching step). The resultant film was a positive biaxial plate having a fast axis in the conveying direction. The positive biaxial plate had a front retardation Re of 20 nm and a thickness direction retardation Rth of −80 nm.

(F-3) Manufacture of Polarizing Plate with Compensation Plate for IPS 50 parts by weight of methylolmelamine were dissolved in pure water to prepare an aqueous solution with a solid content of 3.7 wt %, and an aqueous solution containing alumina colloid having a positive charge (average particle diameter: 15 nm) at a solid content of 10 wt % with respect to 100 parts by weight of the aqueous solution was prepared. 18 parts by weight of the aqueous solution were added with respect to 100 parts by weight of a polyvinyl alcohol-based resin having an acetoacetyl group (average polymerization degree: 1,200, saponification degree: 98.5%, acetoacetylation degree: 5 mol %) to prepare an alumina colloid-containing adhesive. The resultant alumina colloid-containing adhesive was applied onto one surface of the triacetyl cellulose (TAC) film (product name: "KC4UW" manufactured by Konica Minolta, Inc.; thickness: 40 μm). On the other hand, a polymer film (trade name "9P75R (thickness: 75 μm, average polymerization degree: 2,400, saponification degree: 99.9%)" manufactured by KURARAY CO., LTD.) whose main component was polyvinyl alcohol was stretched 1.2-fold in the conveying direction while being immersed in a water bath for 1 minute, was stretched 3-fold with reference to the non-stretched film (original length) in the conveying direction while being dyed through immersion in an aqueous solution with a concentration of iodine of 0.3 wt % for 1 minute, was stretched 6-fold with reference to the original length in the conveying direction while being immersed in an aqueous solution with a concentration of boric acid of 4 wt % and a concentration of potassium iodide of 5 wt %, and was dried at 70° C. for 2 minutes to produce a polarizer. The above-mentioned TAC film/alumina colloid-containing adhesive laminate was laminated onto one surface of the resultant polarizer by roll-to-roll in such a manner that the conveying directions thereof were parallel to each other. Subsequently, the first anisotropic optical element having a surface to which the alumina colloid-containing adhesive had been applied was laminated onto the opposite surface of the polarizer by roll-to-roll in such a manner that the conveying directions thereof were parallel to each other. After that, the resultant was dried at 55° C. for 6 minutes to obtain a polarizing plate having a single axis transmittance of 43.2% at a wavelength of 589 nm (first optical anisotropic element/polarizer/TAC film). The second optical anisotropic element was laminated onto a surface of the first optical anisotropic element of the polarizing plate through intermediation of an acrylic pressure-sensitive adhesive (thickness: 5 μm) by roll-to-roll in such a manner that the conveying directions thereof were parallel to each other, thereby obtaining a polarizing plate with a compensation plate for IPS.

(G) Manufacture of Liquid Crystal Display Apparatus

A liquid crystal display panel was taken out of a liquid crystal display apparatus of the IPS mode (trade name: "iPad2" manufactured by Apple Inc.), and an optical member such as a polarizing plate was removed from the liquid crystal display panel to take out a liquid crystal cell. Both surfaces (outside of each glass substrate) of the liquid crystal cell were cleaned for use. As the first polarizing plate, a commercially available polarizing plate (product name: "CVT1764FCUHC" manufactured by Nitto Denko Corporation) was attached onto the upper side of the liquid crystal cell (viewer side). Further, in order to improve visibility in viewing the liquid crystal display apparatus while wearing polarizing sunglasses, a λ/4 wavelength plate (trade name: "UTZ film #140" manufactured by Kaneka Corporation) was attached onto the first polarizing plate through intermediation of an acrylic pressure-sensitive adhesive in such a manner that its slow axis formed an angle of 45° with respect to the absorption axis of the first polarizing plate. In addition, as the second polarizing plate, the polarizing plate with a compensation plate for IPS, which had been obtained in the section (F), was attached onto the lower side of the liquid crystal cell (light source side) through intermediation of an acrylic pressure-sensitive adhesive to obtain a liquid crystal display panel. In this case, the polarizing plates were attached in such a manner that the transmission axis of the first polarizing plate was in the X direction in FIG. 1 and the transmission axis of the second polarizing plate was in the Y direction in FIG. 1. The surface light source device manufactured in the section (E) was assembled to the liquid crystal display panel to manufacture a liquid crystal display apparatus illustrated in FIG. 1. The resultant liquid crystal display apparatus was subjected to the above-mentioned evaluations (1) to (4). Table 1 shows the results.

Example 2

A liquid crystal display apparatus was manufactured in a similar manner to Example 1 except that a polarized light selective reflection sheet (product name: "DBEF" manufactured by 3M Company) was arranged between the second polarizing plate of the liquid crystal display panel and the prism sheet. The obtained liquid crystal display apparatus was subjected to the above-mentioned evaluations (1) to (4). Table 1 shows the results.

Comparative Example 1

A light guide plate, in which a white PET sheet was used as a reflection sheet, and a dot-like light diffusion layer was formed on a back surface side, was used. This light guide plate did not include the back surface-side unit optical elements or the light output-side unit optical elements, and a light scattering layer of the light guide plate had a gray-scale pattern in which a size of dots became larger as being away from the light source unit. In this light guide plate, the direction (first direction; output angle: α) in which the first directivity light TA had the maximum intensity was located in the vicinity of 65°, but such light in which an output angle was distributed more widely than in the light guide plate used in the examples was output therefrom. Moreover, the white PET sheet was used as the reflection sheet. A liquid crystal display apparatus was manufactured in a similar manner to Example 1 except that the light guide plate and the reflection sheet, which were as described above, were used, that arrangement was made so as to set the transmission axis of the first polarizing plate of the liquid crystal display panel along the Y direction and to set the transmission axis of the second polarizing plate along the X direction, and that the polarized light selective reflection sheet was arranged between the second polarizing plate of the liquid crystal display panel and the prism sheet. The obtained liquid crystal display apparatus was subjected to the above-mentioned evaluations (1) to (4). Table 1 shows the results.

Comparative Example 2

A liquid crystal display apparatus was manufactured in a similar manner to Example 1 except that the arrangement was made so as to set the transmission axis of the first polarizing plate of the liquid crystal display panel along the Y direction and to set the transmission axis of the second polarizing plate along the X direction. The obtained liquid crystal display apparatus was subjected to the above-mentioned evaluations (1) to (4). Table 1 shows the results.

Comparative Example 3

A liquid crystal display apparatus was manufactured in a similar manner to Comparative Example 1 except that the polarized light selective reflection sheet was not used. The obtained liquid crystal display apparatus was subjected to the above-mentioned evaluations (1) to (4). Table 1 shows the results.

Example 3

A light guide plate different in the cross-sectional shape of the light output-side unit optical elements (this light guide plate is hereinafter referred to as a double-sided prism. B in some cases) was manufactured in a similar manner to the double-sided prism A of Example 1. Specifically, in the double-sided prism B, each of the light output-side unit optical elements had a prism shape in which a cross-section had a right-angled isosceles triangular column shape (base angles: θ1=θ2=45°; vertex angle: 90°), and a ridge line direction thereof was set as the direction (Y direction) perpendicular to the ridge line direction of the back surface-side unit optical elements. A liquid crystal display apparatus was manufactured in a similar manner to Example 2 except that this double-sided prism B was used as the light guide plate in place of the double-sided prism A, and that an acrylic resin film (in-plane retardation Re=3 nm, thickness direction retardation Rth=10 nm, thickness=40 μm) was used as the base portion of the prism sheet in place of the TAC film. The obtained liquid crystal display apparatus was subjected to the above-mentioned evaluations (1) to (4). Table 1 shows the results. Note that, this acrylic resin film was manufactured in the following manner. 100 parts by weight of an imidized MS resin described in Production Example 1 of JP 2010-284840 A and 0.62 part by weight of a triazine-based ultraviolet absorber (trade name: T-712 manufactured by Adeka Corporation) were mixedwith each other at 220° C. by a biaxial kneader, so that resin pellets were prepared. The obtained resin pellets were dried at 100.5 kPa and 100° C. for 12 hours, were extruded from a T die at a die temperature of 270° C. by a uniaxial extruder, and were formed into a film shape (thickness: 160 μm). Moreover, the film was stretched in a conveying direction thereof under an atmosphere of 150° C. (thickness: 80 μm), and subsequently, was stretched in a direction perpendicular to the conveying direction under an atmosphere of 150° C. so that a film with a thickness of 40 μm was obtained.

Example 4

A light guide plate different in the cross-sectional shape of the light output-side unit optical elements (this light guide plate is hereinafter referred to as a double-sided prism C in some cases) was manufactured in a similar manner to the double-sided prism A of Example 1. Specifically, in the double-sided prism C, each of the light output-side unit optical elements had a prism shape in which a cross-section had an isosceles triangular column shape (base angles: θ1=θ2=20°; vertex angle: 140°), and a ridge line direction thereof was set as the direction (Y direction) perpendicular to the ridge line direction of the back surface-side unit optical elements. A liquid crystal display apparatus was manufactured in a similar manner to Example 2 except that this double-sided prism C was used as the light guide plate in place of the double-sided prism A, and that the acrylic resin film of Example 3 was used as the base portion of the prism sheet in place of the TAC film. The obtained liquid crystal display apparatus was subjected to the above-mentioned evaluations (1) to (4). Table 1 shows the results.

Example 5

A light guide plate different in the cross-sectional shape of the light output-side unit optical elements (this light guide plate is hereinafter referred to as a double-sided prism D in some cases) was manufactured in a similar manner to the double-sided prism A of Example 1. Specifically, in the double-sided prism D, each of the light output-side unit optical elements had a prism shape in which a cross-section had a shape similar to an isosceles triangular column shape (shape in which a base portion of the isosceles triangle having base angles of $\theta_1=\theta_2=20°$ and a vertex angle of 140° had a curved shape in cross section), and a ridge line direction thereof was set as the direction (Y direction) perpendicular to the ridge line direction of the back surface-side unit optical elements. A liquid crystal display apparatus was manufactured in a similar manner to Example 2 except that this double-sided prism D was used as the light guide plate in place of the double-sided prism A, and that the acrylic resin film of Example 3 was used as the base portion of the prism sheet in place of the TAC film. The obtained liquid crystal display apparatus was subjected to the above-mentioned evaluations (1) to (4). Table 1 shows the results.

Example 6

A liquid crystal display apparatus was manufactured in a similar manner to Example 2 except that the acrylic resin film of Example 3 was used as the base portion of the prism sheet in place of the TAC film. The obtained liquid crystal display apparatus was subjected to the above-mentioned evaluations (1) to (4). Table 1 shows the results.

Example 7

A liquid crystal display apparatus was manufactured in a similar manner to Example 6 except that a liquid crystal display panel was taken out of a liquid crystal display apparatus of an MVA mode (trade name: "KDL20J3000" manufactured by Sony Corporation) in place of the liquid crystal display apparatus of the IPS mode, and that a liquid crystal cell of this panel was used. The obtained liquid crystal display apparatus was subjected to the above-mentioned evaluations (1) to (4). Table 1 shows the results.

Example 8

A liquid crystal display apparatus was manufactured in a similar manner to Example 2 except that the dual lamp-type surface light source device as illustrated in FIG. 1 and FIGS. 4(a) and 4(b) was used, that, in correspondence thereto, a double-sided prism E being a dual lamp-type design of the double-sided prism A (in which a cross-sectional shape of the back surface-side unit optical elements was the wedge-like prism columnar shape having the asymmetrical shape on the cross section parallel to the array direction and parallel to the thickness direction as illustrated in FIG. 6(b)) was used as the light guide plate, and that the acrylic resin film of Example 3 was used as the base portion of the prism sheet in place of the TAC film. The obtained liquid crystal display apparatus was subjected to the above-mentioned evaluations (1) to (4). Table 1 shows the results.

TABLE 1

| | Upper polarizing plate | Liquid crystal panel | Lower polarizing plate | Polarized light selective reflection sheet | Prism sheet base portion | Light guide plate | Reflection sheet | Accumulated luminous flux ratio | Direction of maximum intensity in light guide plate | Ratio of polarized light component | Output characteristics of surface light source |
|---|---|---|---|---|---|---|---|---|---|---|---|
| Example 1 | 0° | IPS | 90° | None | TAC | Double-sided prism A | Silver | 86% | 76° | 55% | 47° |
| Example 2 | 0° | IPS | 90° | Present | TAC | Double-sided prism A | Silver | 131% | 76° | 55% | 47° |
| Comparative Example 1 | 90° | IPS | 0° | Present | TAC | Dot pattern | White PET | 100% | 75° | 51% | 53° |
| Comparative Example 2 | 90° | IPS | 0° | None | TAC | Double-sided prism A | Silver | 73% | 76° | 55% | 47° |
| Comparative Example 3 | 90° | IPS | 0° | None | TAC | Dot pattern | White PET | 67% | 75° | 51% | 53° |
| Example 3 | 0° | IPS | 90° | Present | Acrylic resin | Double-sided prism B | Silver | 135% | 76° | 55% | 42° |
| Example 4 | 0° | IPS | 90° | Present | Acrylic resin | Double-sided prism C | Silver | 115% | 76° | 54% | 49° |
| Example 5 | 0° | IPS | 90° | Present | Acrylic resin | Double-sided prism D | Silver | 110% | 76° | 53% | 52° |
| Example 6 | 0° | IPS | 90° | Present | Acrylic resin | Double-sided prism A | Silver | 130% | 76° | 55% | 47° |
| Example 7 | 0° | MVA | 90° | Present | Acrylic resin | Double-sided prism A | Silver | 110% | 76° | 55% | 47° |

TABLE 1-continued

| | Upper polarizing plate | Liquid crystal panel | Lower polarizing plate | Polarized light selective reflection sheet | Prism sheet base portion | Light guide plate | Reflection sheet | Accumulated luminous flux ratio | Direction of maximum intensity in light guide plate | Ratio of polarized light component | Output characteristics of surface light source |
|---|---|---|---|---|---|---|---|---|---|---|---|
| Example 8 | 0° | IPS | 90° | Present | Acrylic resin | Double-sided prism E | Silver | 133% | ±76° | 55% | 47° |

<Evaluation>

The polarized light selective reflection sheet is extremely expensive. Accordingly, when the polarized light selective reflection sheet can be omitted in the liquid crystal display apparatus, great advantages are brought from all viewpoints of the cost, the manufacturing efficiency, and the thinning. Meanwhile, in order to maintain the favorable display quality, it is necessary to obtain a total luminous flux of 80% or more with respect to the case of using the polarized light selective reflection sheet. Here, as is apparent from Table 1, in the liquid crystal display apparatus of Example 1, the accumulated luminous flux ratio of the total luminous flux was 80% or more of that of the liquid crystal display apparatus including the polarized light selective reflection sheet, and a bright and favorable image was able to be displayed even when the polarized light selective reflection sheet was not provided. Moreover, in the liquid crystal display apparatus of Example 2, which included the polarized light selective reflection sheet, the accumulated luminous flux ratio thereof with respect to the corresponding liquid crystal display apparatus (Comparative Example 1) with the conventional configuration became 134%, and the liquid crystal display apparatus of Example 2 became a display apparatus, which had significantly higher brightness and higher utilization efficiency of the light.

As is apparent from comparison between Example 1 and Comparative Example 2, when viewed from the front direction of the liquid crystal display apparatus, the transmission axis direction of the second polarizing plate 14 and the main polarization direction of the light (second directivity light L2) output from the prism sheet 30 were set parallel to each other so that the brightness was able to be enhanced by increasing the transmitted light amount.

As described above, according to the present invention, with a relatively simple configuration, the utilization efficiency of the light in the liquid crystal display apparatus can be enhanced, and the bright image can be displayed. Moreover, according to the present invention, even when the expensive polarized light selective reflection sheet or the like is not used, the utilization efficiency of the light is high, and favorable brightness can be realized.

Industrial Applicability

The liquid crystal display apparatus of the present invention can be used for various applications such as portable devices including a personal digital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

Reference Signs List 1 liquid crystal display apparatus
10 light source unit
10a point light source
11 reflection sheet
12 liquid crystal cell
13 first polarizing plate
14 second polarizing plate
15 liquid crystal display panel
16 polarized light selective reflection sheet
20 surface light source device
21 light guide plate
24 light output-side unit optical element
26 back surface-side unit optical element
30 prism sheet
31 base portion
33 unit prism
34 first inclined surface
35 second inclined surface

The invention claimed is:

1. A liquid crystal display apparatus, comprising:
a liquid crystal display panel comprising a liquid crystal cell between a first polarizing plate provided on a viewer side and a second polarizing plate provided on a back surface side; and
a surface light source device for illuminating the liquid crystal display panel from the back surface side,
wherein the surface light source device comprises:
a light source unit;
a light guide plate for causing light from the light source unit to enter from a light incident surface opposed to the light source unit, and for outputting first directivity light from a light output surface opposed to the liquid crystal display panel, the first directivity light being polarized light having directivity of maximum intensity in a first direction, which forms a predetermined angle from a normal direction of the light output surface in a plane approximately parallel to a light guiding direction of light, and having a high ratio of a polarized light component oscillating in the plane; and
a prism sheet arranged on a liquid crystal display panel side with respect to the light guide plate, the prism sheet comprising a prism portion in which a plurality of columnar unit prisms protruding on a light guide plate side are arrayed, the prism sheet being configured to convert the first directivity light into second directivity light directed in a second direction within a predetermined angle from the normal direction of the light output surface of the light guide plate while substantially maintaining a polarization state of the first directivity light, wherein a ridge line direction of the columnar unit prisms is approximately parallel to the light incident surface of the light guide plate, wherein a transmission axis of the second polarizing plate is approximately parallel to a polarization direction of the second directivity light and the light guiding direction of the light in the light guide plate, and wherein the transmission axis of the second polarizing plate is approximately perpendicular to a transmission axis of the first polarizing plate.

2. A liquid crystal display apparatus according to claim 1, wherein the prism sheet comprises a base portion on the liquid crystal display panel side with respect to the prism portion, the base portion supporting the prism portion, and substantially having optical isotropy.

3. A liquid crystal display apparatus according to claim 1, wherein the first directivity light contains, by 52% or more, the polarized light component oscillating in the plane approximately parallel to the light guiding direction of the light.

4. A liquid crystal display apparatus according to claim 1,
wherein the light guide plate contains a light scattering material,
wherein the light guide plate comprises a plurality of columnar back surface-side unit optical elements protruding on a back surface side of the light guide plate, the plurality of columnar back surface-side unit optical elements being arrayed from the light incident surface side of the light guide plate to a side surface on an opposite side, and
wherein an array direction of the columnar unit prisms is approximately parallel to an array direction of the plurality of columnar back surface-side unit optical elements.

5. A liquid crystal display apparatus according claim 1, further comprising a polarized light selective reflection sheet between the surface light source device and the first polarizing plate.

* * * * *